United States Patent
Inoue

(10) Patent No.: US 9,735,619 B2
(45) Date of Patent: Aug. 15, 2017

(54) POWER CONVERSION DEVICE

(75) Inventor: Sadayuki Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 374 days.

(21) Appl. No.: 14/370,164

(22) PCT Filed: Aug. 21, 2012

(86) PCT No.: PCT/JP2012/071071
§ 371 (c)(1),
(2), (4) Date: Jul. 1, 2014

(87) PCT Pub. No.: WO2013/118336
PCT Pub. Date: Aug. 15, 2013

(65) Prior Publication Data
US 2014/0327306 A1 Nov. 6, 2014

(30) Foreign Application Priority Data
Feb. 8, 2012 (JP) .................................. 2012-024601

(51) Int. Cl.
*H02J 9/06* (2006.01)
*H02J 7/02* (2016.01)
(Continued)

(52) U.S. Cl.
CPC ............... *H02J 9/062* (2013.01); *H02J 3/32* (2013.01); *H02J 7/0029* (2013.01); *H02J 7/022* (2013.01);
(Continued)

(58) Field of Classification Search
CPC .. H02J 9/06; H02J 7/00; H02M 5/451; H02M 5/44; B60L 1/00; H02P 9/00
(Continued)

(56) References Cited

U.S. PATENT DOCUMENTS 6,175,511 B1 * 1/2001 Ooba ...................... H02J 9/062
307/66
7,608,937 B1 * 10/2009 Altenschulte ............. H02J 7/34
290/44
(Continued)

FOREIGN PATENT DOCUMENTS

| CN | 101521392 A | 9/2009 |
|---|---|---|
| CN | 101826741 A | 9/2010 |
| JP | 4641507 | 3/2011 |

OTHER PUBLICATIONS

Office Action issued on Dec. 30, 2015 in Chinese Patent Application No. 201280069191.6 with partial English translation.
(Continued)

*Primary Examiner* — Jared Fureman
*Assistant Examiner* — Win Htun
(74) *Attorney, Agent, or Firm* — Oblon, McClelland, Maier & Neustadt, L.L.P.

(57) ABSTRACT

A power conversion device connected between a storage battery and AC system charges the storage battery with power from the AC system and discharges power from the storage battery to the AC system. The power conversion device includes a DC/DC conversion circuit performing conversion between a storage battery voltage and DC bus voltage, a DC/AC conversion circuit performing conversion between the DC bus voltage and AC voltage of the AC system, and control circuits controlling the DC/DC and DC/AC conversion circuits. The control circuits select either step-up control or step-down control for the DC/DC conversion circuit based on the storage battery voltage, the storage battery charge state, and a control range of the DC bus voltage, set a control target value of the DC bus voltage,
(Continued)

and control the DC/DC and DC/AC conversion circuits by the selected control method so the DC bus voltage becomes the control target value.

9 Claims, 22 Drawing Sheets

(51) Int. Cl.
*H02J 3/32* (2006.01)
*H02J 7/00* (2006.01)
*H02J 7/04* (2006.01)
*H02M 3/335* (2006.01)
*H02M 1/00* (2006.01)

(52) U.S. Cl.
CPC ......... *H02J 7/047* (2013.01); *H02J 2007/004* (2013.01); *H02J 2007/0037* (2013.01); *H02M 3/33584* (2013.01); *H02M 2001/007* (2013.01); *Y10T 307/344* (2015.04)

(58) Field of Classification Search
USPC ......... 307/10.1, 19, 24, 25, 66, 23; 320/134; 322/25
See application file for complete search history.

(56) References Cited

U.S. PATENT DOCUMENTS

| 2008/0157593 | A1* | 7/2008 | Bax | B60L 11/123 307/10.1 |
| 2011/0127837 | A1* | 6/2011 | Sato | H02J 9/062 307/66 |
| 2012/0013175 | A1* | 1/2012 | Newman, Jr. | B60R 16/033 307/9.1 |
| 2012/0112547 | A1* | 5/2012 | Ghosh | H02J 9/062 307/66 |

OTHER PUBLICATIONS

International Search Report Issued Dec. 4, 2012 in PCT/JP12/071071 Filed Aug. 21, 2012.

\* cited by examiner

POWER CONVERSION DEVICE

TECHNICAL FIELD

The present invention relates to a power conversion device connected between a storage battery and an AC system, for charging the storage battery with power from the AC system and discharging power from the storage battery to the AC system, and particularly, to a control method therefor.

BACKGROUND ART

In recent years, in order to reduce environmental load, a power generation system utilizing natural energy such as solar power generation, that does not emit carbon dioxide is spreading into homes. For example, Patent Document 1 shown below discloses a configuration of a power feed system in which solar power generation and a storage battery are combined to supply power to a system in coordination with each other, and a control technique for the power feed system.

Specifically, the power feed system includes a first DC/DC converter for converting first DC voltage from the solar power generation to second DC voltage, a second DC/DC converter for converting third DC voltage from the storage battery to fourth DC voltage, a supply section for connecting outputs of the first and second DC/DC converters to a load, and a DC/AC inverter for synchronizing DC voltage from the supply section with an AC voltage waveform supplied from a system, to output AC power. Then, the following method is described as an example. In peakcutting for solving power shortage, in the case where the solar power generation is prioritized to supply power to the AC load, a target DC voltage value for generation of the second DC voltage by the first DC/DC converter is set to be higher than a target DC voltage value for generation of the fourth DC voltage by the second DC/DC converter, whereby generated power by the solar power generation is preferentially supplied to the AC load.

Upon power outage, power generation using natural energy represented by solar power generation can only output the maximum power of 1500 W from an autonomous operation outlet provided in advance in a power conversion device. Meanwhile, after Great East Japan Earthquake, in order to cope with power shortage or the like, various companies are developing and producing a system having a storage battery, a system using an electric automobile as a storage battery, a system combining solar power generation and a storage battery, and the like. In the above systems, a lithium-ion battery is often used as a storage battery.

CITATION LIST

Patent Document

Patent Document 1: Japanese Patent No. 4641507

SUMMARY OF THE INVENTION

Problems to be Solved by the Invention

As described above, in various systems having storage batteries in recent years, there are various types of storage batteries as a charging/discharging target. For example, State of Charge (SoC) of each storage battery provided in electric automobiles sold by automobile makers differs depending on vehicle type. In addition, power conversion devices having a storage battery therein are also sold by several companies, and SoC of the storage battery is also different among makers.

Further, for example, a lithium-ion battery used as a storage battery in an electric automobile or a home storage battery system is charged or discharges power by chemical reaction. Therefore, for example, in the case of charging the storage battery, when charge current is sharply changed, chemical reaction does not follow the change in the charge current and metal lithium precipitates, so that the storage battery may be damaged to be deteriorated.

Therefore, in the case where various types of storage batteries having different ratings are to be processed in charging and discharging, it is necessary to provide control means capable of appropriately adapting to the rating of an individual storage battery or the characteristic of the storage battery.

Particularly, in the case of performing charging from an AC system or discharging to an AC system, generally, the control range of DC bus voltage set in each of power conversion devices composing the various types of power feed systems is based on voltage of the AC system, but voltage of each storage battery to be processed is set irrespective of the control range.

Meanwhile, in the power feed system described in Patent Document 1, although the case where power from the solar power generation is preferentially converted to AC power and the AC power is supplied to the AC load is described, any control means or control method capable of appropriately adapting to various types of storage batteries to be processed is not described.

The present invention has been made to solve the problems of the conventional technique as described above, and an object of the present invention is to provide a power conversion device capable of appropriate processing control of charging and discharging for various types of storage batteries.

Means of Solution to the Problems

A power conversion device of the present invention is connected between a storage battery and an AC system, and charges the storage battery with power from the AC system and discharges power from the storage battery to the AC system. The power conversion device includes a DC/DC conversion circuit for performing conversion between storage battery voltage of the storage battery and DC bus voltage, a DC/AC conversion circuit for performing conversion between the DC bus voltage and AC voltage of the AC system, and a control circuits for controlling the DC/DC conversion circuit and the DC/AC conversion circuit. The control circuits select either step-up control or step-down control as a control method for the DC/DC conversion circuit based on the storage battery voltage, state of charge of the storage battery, and a control range of the DC bus voltage, and set a control target value of the DC bus voltage. The control circuits control the DC/DC conversion circuit and the DC/AC conversion circuit by the selected control method so that the DC bus voltage becomes the control target value.

Effect of the Invention

As described above, a control function of a power conversion device of the present invention selects either step-up control or step-down control as a control method for the DC/DC conversion circuit based on a storage battery voltage, state of charge of the storage battery, and a control range of a DC bus voltage, sets a control target value of the DC bus voltage, and controls the DC/DC conversion circuit and the DC/AC conversion circuit by the selected control method so that the DC bus voltage becomes the control target value. Therefore, it becomes possible to obtain a power conversion device capable of appropriate processing control of charging and discharging for various types of storage batteries having different voltages.

EMBODIMENTS FOR CARRYING OUT THE INVENTION

Embodiment 1

Figure 1:
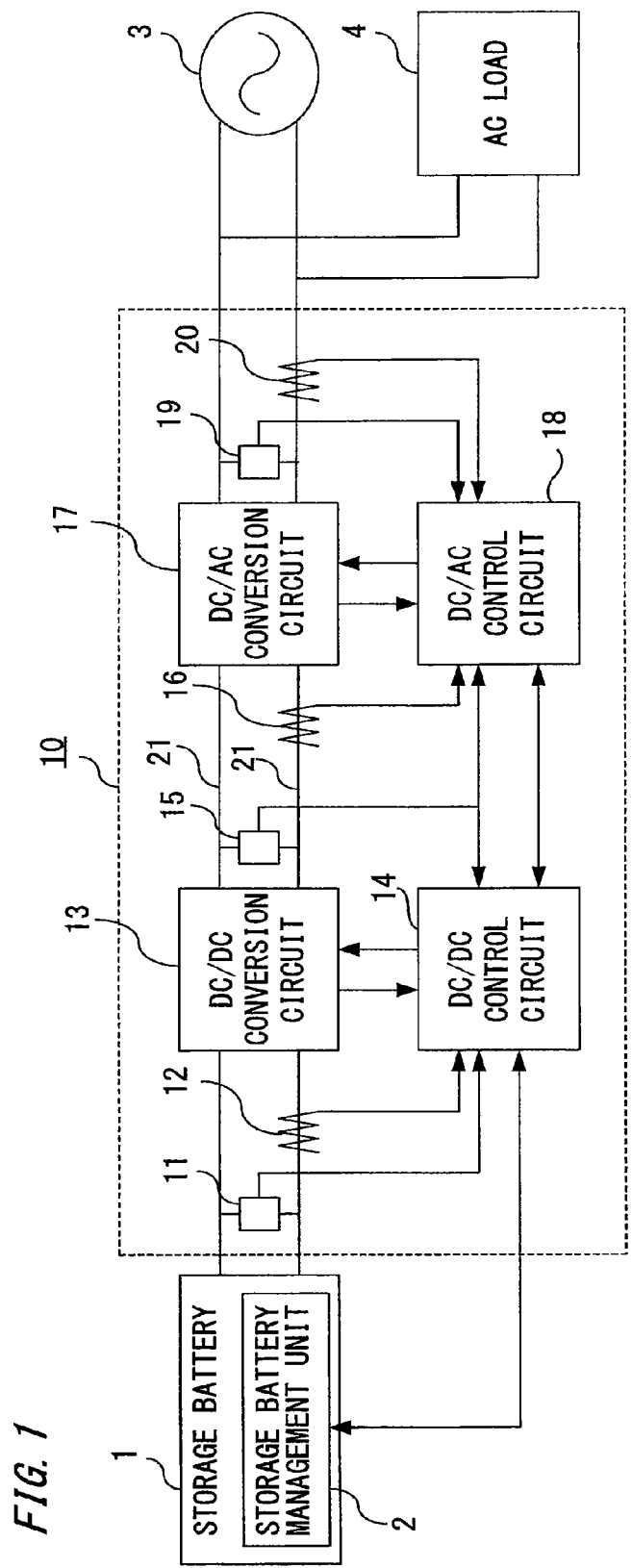
FIG. 1 is a diagram schematically showing the system configuration of a power conversion device of embodiment 1 of the present invention.

FIG. 1 is a system configuration diagram of a power conversion device according to embodiment 1 of the present invention. In FIG. 1, a power conversion device 10 is connected between a storage battery 1 and an AC system. The storage battery 1 includes a storage battery management unit 2 for managing the state of charge of the storage battery 1, the temperature inside the storage battery 1, the characteristic such as SoC, and the like. A power system 3 which is an AC power supply, and an AC load 4 are connected to the AC system.

The power conversion device 10 includes: a DC/DC conversion circuit 13 as DC/DC conversion means for performing conversion between storage battery voltage of the storage battery 1 and DC bus voltage of a DC bus 21; a DC/AC conversion circuit 17 as DC/AC conversion means for performing conversion between DC bus voltage and AC voltage of the AC system; and a DC/DC control circuit 14 and a DC/AC control circuit 18 as control means for respectively controlling the DC/DC conversion circuit 13 and the DC/AC conversion circuit 17.

The power conversion device 10 further includes: a voltmeter 11 for measuring output voltage of the storage battery 1; an ammeter 12 for measuring current outputted from the storage battery 1; a voltmeter 15 for measuring DC bus voltage of the DC bus 21 outputted from the DC/DC conversion circuit 13; an ammeter 16 for measuring current outputted from the DC/DC conversion circuit 13; a voltmeter 19 for measuring AC voltage outputted from the DC/AC conversion circuit 17; and an ammeter 20 for measuring AC current outputted from the DC/AC conversion circuit 17.

Thus, the power conversion device 10 includes the voltmeters 11, 15, and 19, the ammeters 12, 16, and 20, the DC/DC conversion circuit 13, the DC/DC control circuit 14, the DC/AC conversion circuit 17, the DC/AC control circuit 18, and the DC bus 21, and performs an operation of converting AC power supplied from the power system 3 to DC power and charging the storage battery 1 with the DC power, and also, an operation of converting DC power stored in the storage battery 1 to AC power and discharging the AC power to the power system 3 and the AC load 4.

Figure 2:
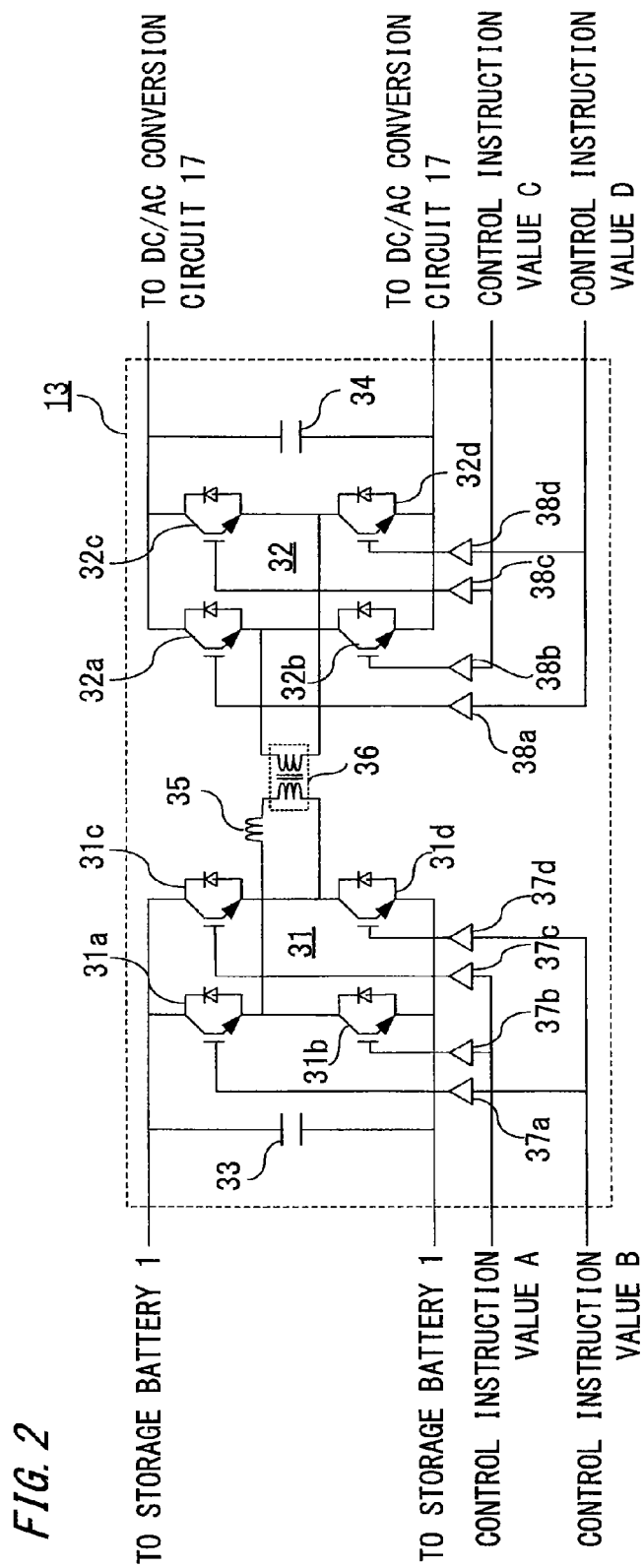
FIG. 2 is a block diagram schematically showing the internal configuration of a DC/DC conversion circuit 13 shown in FIG. 1.

FIG. 2 is a block configuration diagram showing one configuration example of the DC/DC conversion circuit 13 according to embodiment 1 of the present invention. In FIG. 2, the DC/DC conversion circuit 13 includes: a DC/AC converter 31 which has switching devices 31*a* to 31*d* and performs conversion between storage battery voltage of the storage battery 1 and intermediate AC voltage; and an AC/DC converter 32 which has switching devices 32*a* to 32*d* and performs conversion between the intermediate AC voltage and the DC bus voltage. Further, in a circuit for the intermediate AC voltage, a reactor 35 and an insulation transformer 36 are connected.

In addition, a capacitor 33 for smoothing output power of the storage battery 1, a capacitor 34 for smoothing output power to the DC/AC conversion circuit 17, level conversion buffers 37*a* to 37*d* for converting the signal levels of control signals supplied to the switching devices 31*a* to 31*d* to a predetermined level, and level conversion buffers 38*a* to 38*d* for converting the signal levels of control signals supplied to the switching devices 32*a* to 32*d* to a predetermined level, are provided.

Thus, the DC/DC conversion circuit 13 of embodiment 1 includes the DC/AC converter 31 composed of the switching devices 31*a* to 31*d*, the AC/DC converter 32 composed of the switching devices 32*a* to 32*d*, the capacitors 33 and 34, the reactor 35, the insulation transformer 36, the level conversion buffers 37*a* to 37*d*, and the level conversion buffers 38*a* to 38*d*. Then, in the present embodiment 1, the case where the DC/DC conversion circuit 13 is an insulation type which electrically insulates the storage battery 1 side and the DC/AC conversion circuit 17 side from each other as shown in FIG. 2 will be described.

Figure 3:
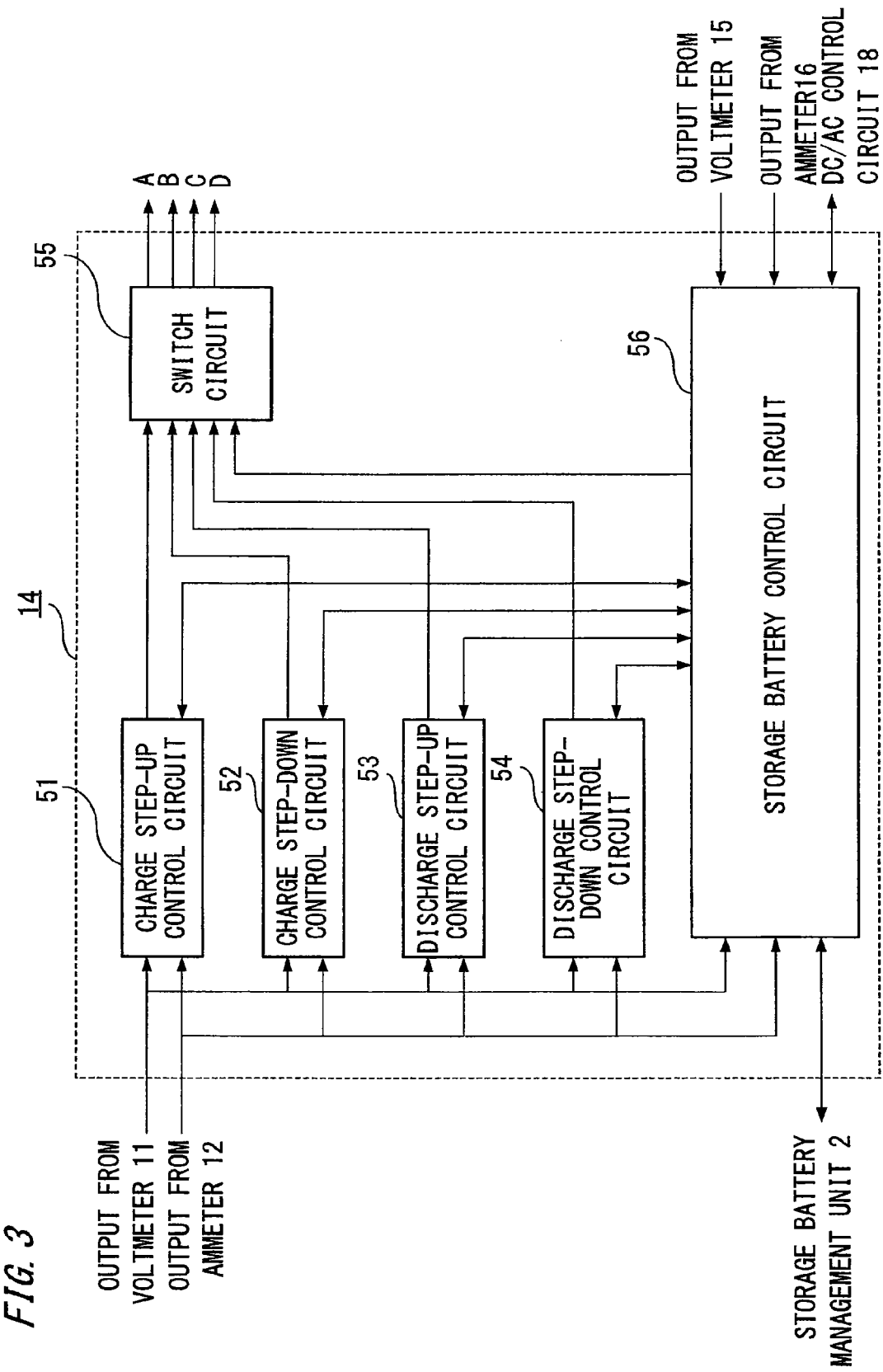
FIG. 3 is a block diagram schematically showing the internal configuration of a DC/DC control circuit 14 shown in FIG. 1.

FIG. 3 is a block configuration diagram of the DC/DC control circuit 14 according to embodiment 1 of the present invention. In FIG. 3, the DC/DC control circuit 14 includes: a charge step-up control circuit 51 for outputting a control instruction value when performing supply control of charge power to the storage battery 1 by step-up control (the details of step-up control will be described later); a charge step-down control circuit 52 for outputting a control instruction value when performing supply control of charge power to the storage battery 1 by step-down control (the details of step-down control will be described later); a discharge step-up control circuit 53 for outputting a control instruction value when performing supply control of discharge power from the storage battery 1 by step-up control; and a discharge step-down control circuit 54 for outputting a control instruction value when performing supply control of discharge power from the storage battery 1 by step-down control; a switch circuit 55 for performing switching among the control circuits 51 to 54; and a storage battery control circuit 56 for performing selection of a control target value and a control method (control algorithm) for controlling the storage battery 1, and the like.

Further, the storage battery control circuit 56 selects a control method in charge control based on storage battery voltage of the storage battery 1, the state of charge of the storage battery 1, and the control range of DC bus voltage, and similarly, selects a control method in discharge control. These selecting operations will be described later in detail.

Thus, the DC/DC control circuit 14 of embodiment 1 includes the charge step-up control circuit 51, the charge step-down control circuit 52, the discharge step-up control circuit 53, the discharge step-down control circuit 54, the switch circuit 55, and the storage battery control circuit 56.

Next, with reference to FIGS. 1 to 22, a concrete operation of the power conversion device of the present embodiment 1 will be described. It is noted that in the following description, in principle, the case (normal operation) where the power conversion device is normally supplied with power from the power system 3 will be described.

Figure 4:
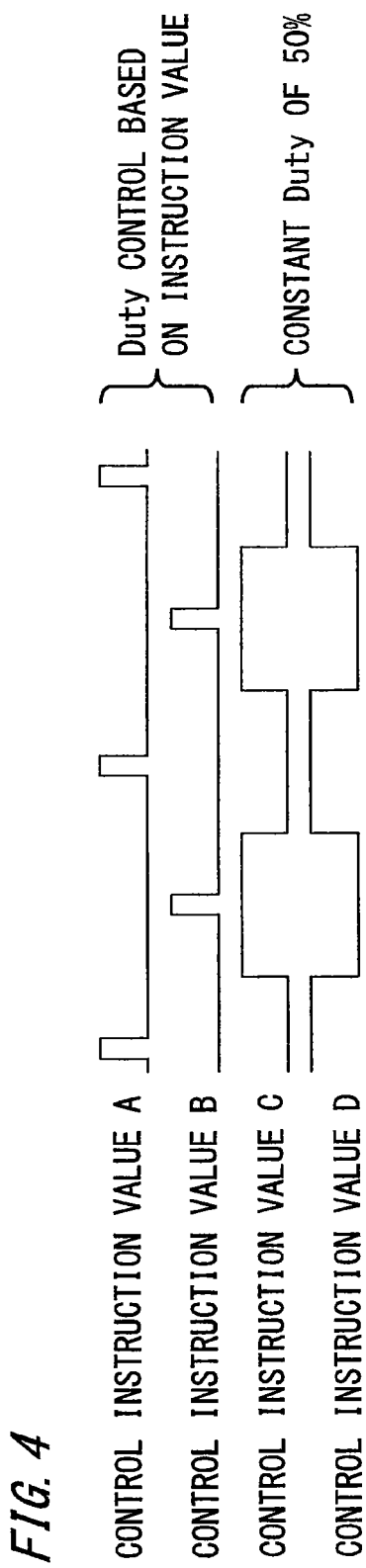
FIG. 4 is a diagram showing an example of output waveforms of control signals upon charge control by step-up control of the DC/DC conversion circuit 13 shown in FIG. 2.

First, a control method for the DC/DC conversion circuit 13 of insulation type shown in FIG. 2 will be described. FIG. 4 shows various control signal waveforms upon charging by step-up control of the DC/DC conversion circuit 13 shown in FIG. 2. In the step-up control upon charging, which is a control method used when DC bus voltage of the DC bus 21 is lower than battery voltage of the storage battery 1, the switching devices 32*a* to 32*d* composing the AC/DC converter 32 are driven at Duty of 50% based on control instruction values C and D outputted from the charge step-up control circuit 51 as shown in FIG. 4, thereby generating AC power, and meanwhile, for the switching devices 31*a* to 31*d* composing the DC/AC converter 31, control signals are generated based on control instruction values A and B outputted from the charge step-up control circuit 51 as shown in FIG. 4, thereby controlling charge power.

Figure 5:
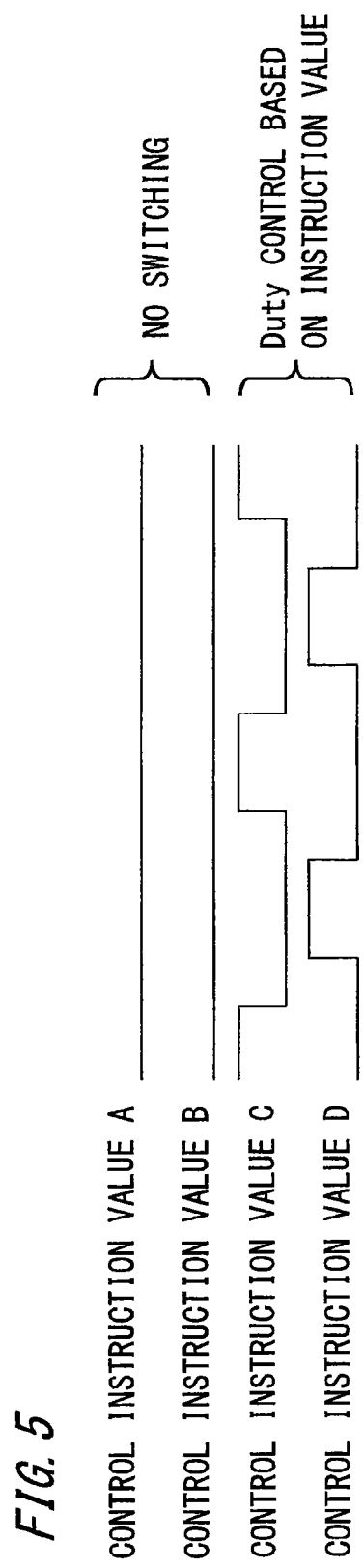
FIG. 5 is a diagram showing an example of output waveforms of control signals upon charge control by step-down control of the DC/DC conversion circuit 13 shown in FIG. 2.

Similarly, a charge step-down control method will be described. FIG. 5 shows various control signal waveforms upon charging by step-down control of the DC/DC conversion circuit 13 shown in FIG. 2. In the step-down control upon charging, which is a control method used when DC bus voltage of the DC bus 21 is higher than battery voltage of the storage battery 1, for the switching devices 32*a* to 32*d* composing the AC/DC converter 32, control signals are generated based on control instruction values C and D outputted from the charge step-down control circuit 52 as shown in FIG. 5, thereby generating AC power. Meanwhile, for the switching devices 31*a* to 31*d* composing the DC/AC converter 31, the nodes are fixed based on control instruction values A and B outputted from the charge step-down control circuit 52 as shown in FIG. 5, thus preventing switching. By thus performing control, the switching devices 31*a* to 31*d* operate as diode switches for rectifying AC power.

Since the charge control by step-down control is configured as described above, power cannot be supplied when DC bus voltage of the DC bus 21 is lower than storage battery voltage of the storage battery 1. On the other hand, in the case of step-up control, as described in FIG. 4, by Duty control operation based on the control instruction values A and B, power energy stored in the reactor 35 once is fed to the storage battery 1, and therefore, power can be supplied even when DC bus voltage of the DC bus 21 is higher than storage battery voltage of the storage battery 1.

Figure 6:
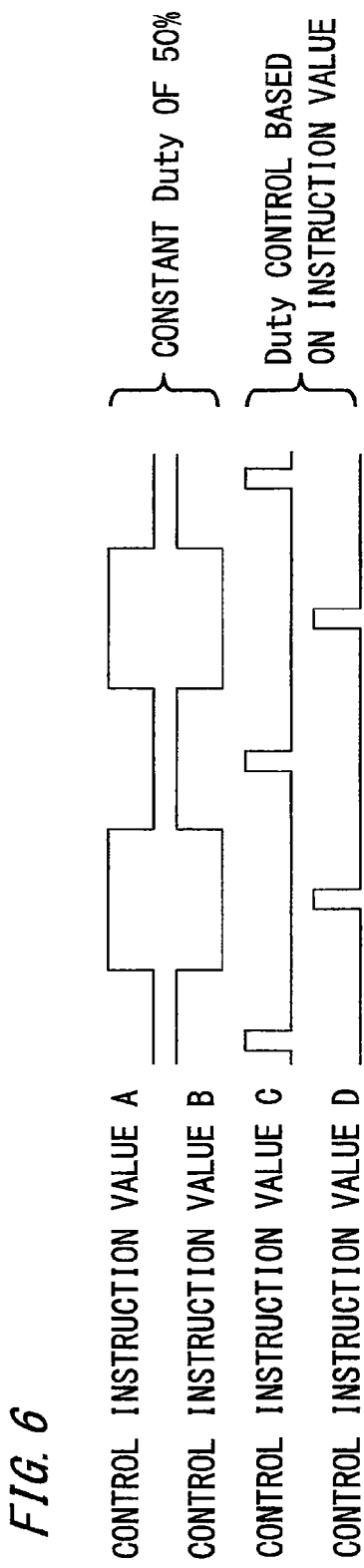
FIG. 6 is a diagram showing an example of output waveforms of control signals upon discharge control by step-up control of the DC/DC conversion circuit 13 shown in FIG. 2.

Next, a discharge step-up control method will be described. FIG. 6 shows various control signal waveforms upon discharging by step-up control of the DC/DC conversion circuit 13 shown in FIG. 2. In the step-up control upon discharging, which is a control method used when DC bus voltage of the DC bus 21 is higher than storage battery voltage of the storage battery 1, the switching devices 31*a* to 31*d* composing the DC/AC converter 31 are driven at Duty of 50% based on control instruction values A and B outputted from the discharge step-up control circuit 53 as shown in FIG. 6, thereby generating AC power, and meanwhile, for the switching devices 32*a* to 32*d* composing the AC/DC converter 32, control signals are generated based on control instruction values C and D outputted from the discharge step-up control circuit 53 as shown in FIG. 6, thereby controlling discharge power.

Figure 7:
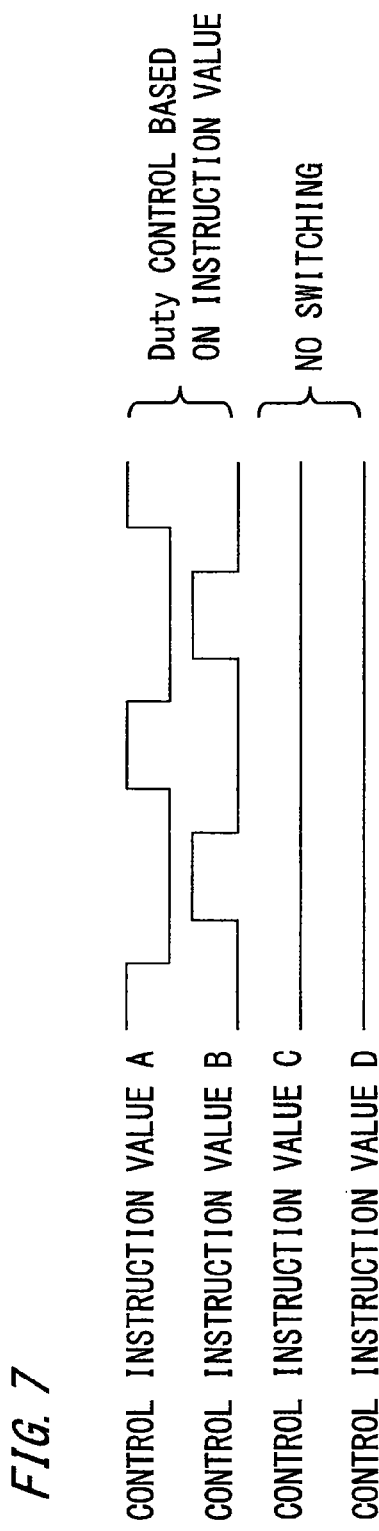
FIG. 7 is a diagram showing an example of output waveforms of control signals upon discharge control by step-down control of the DC/DC conversion circuit 13 shown in FIG. 2.

Similarly, a discharge step-down control method will be described. FIG. 7 shows various control signal waveforms upon discharging by step-down control of the DC/DC conversion circuit 13 shown in FIG. 2. In the step-down control upon discharging, which is a control method used when DC bus voltage of the DC bus 21 is lower than storage battery voltage of the storage battery 1, for the switching devices 31a to 31d composing the DC/AC converter 31, control signals are generated based on control instruction values A and B outputted from the discharge step-down control circuit 54 as shown in FIG. 7, thereby generating AC power. Meanwhile, for the switching devices 32a to 32d composing the AC/DC converter 32, the nodes are fixed based on control instruction values C and D outputted from the discharge step-down control circuit 54 as shown in FIG. 7, thus preventing switching. By thus performing control, the switching devices 32a to 32d operate as diode switches for rectifying AC power.

Since the discharge control by step-down control is configured as described above, power cannot be supplied when DC bus voltage of the DC bus 21 is higher than storage battery voltage of the storage battery 1. On the other hand, in the case of step-up control, power can be supplied even when DC bus voltage of the DC bus 21 is lower than storage battery voltage of the storage battery 1.

Figure 8:
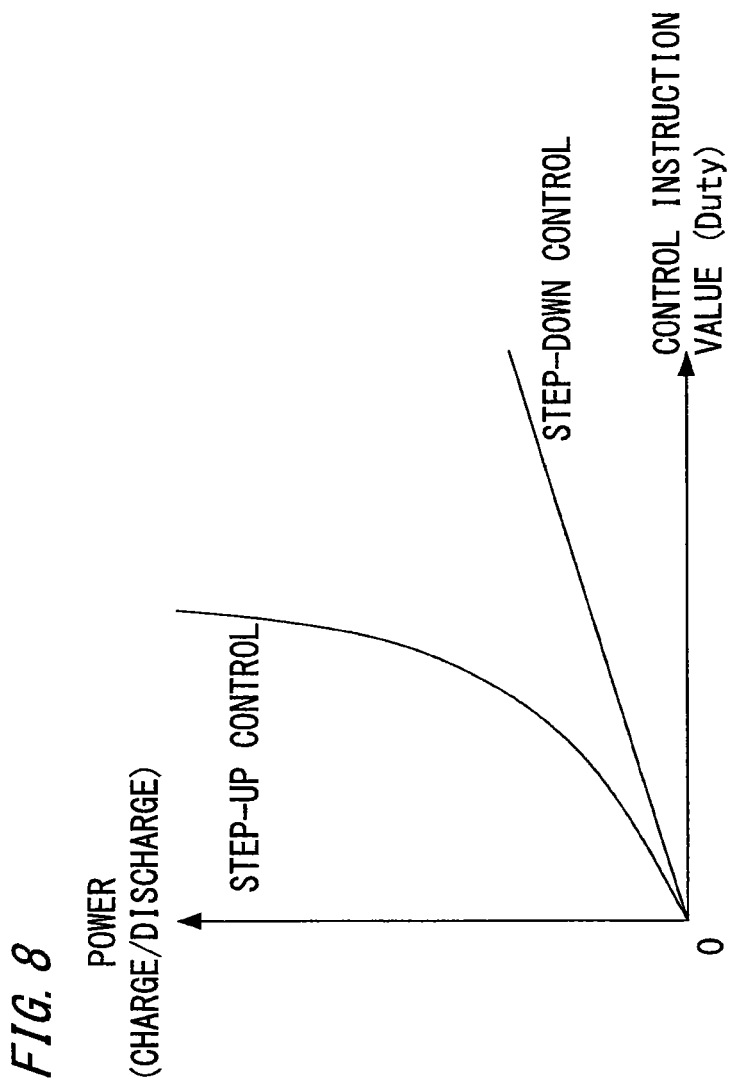
FIG. 8 is a diagram showing the relationship between a control instruction value and charge/discharge power in the case where the control signals shown in FIGS. 4 to 7 are outputted in the present embodiment 1.

FIG. 8 shows the relationship between control instruction values (referred to as Duty) upon step-up control and step-down control and power upon charging or discharging. As shown in FIG. 8, in the case of using the step-up control method, a large amount of power can be transmitted but power sensitively responds to change in the control instruction value. In the case of step-down control, power mildly responds to change in the control instruction value but power that can be supplied is smaller than in the step-up control method.

Figure 9:
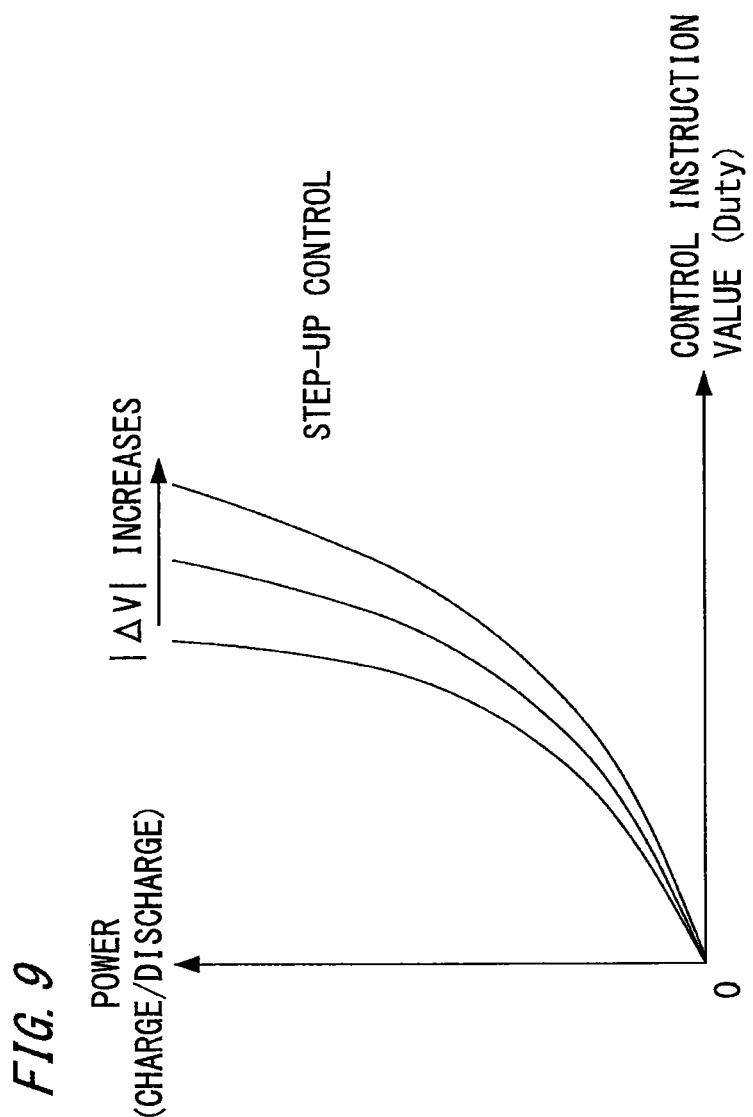
FIG. 9 is a diagram showing the relationship between a control instruction value and charge/discharge power upon step-up control in the present embodiment 1.

FIG. 9 shows how the relationship between the control instruction value (Duty) upon step-up control and power upon charging or discharging changes depending on a difference |ΔV| between the DC bus voltage of the DC bus 21 and the storage battery voltage of the storage battery 1. As shown in FIG. 9, the characteristic (slope) becomes mild as |ΔV| increases. It is noted that, although not shown, the characteristic (slope) becomes sharp as the sum of DC bus voltage of the DC bus 21 and storage battery voltage of the storage battery 1 increases.

Figure 10:
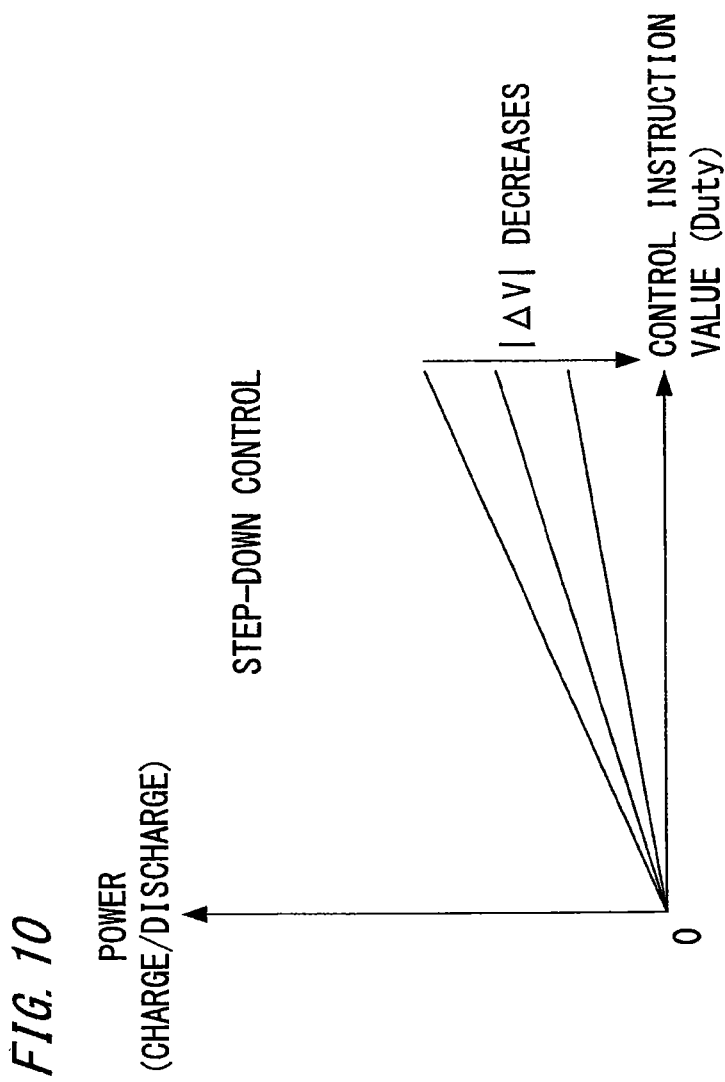
FIG. 10 is a diagram showing the relationship between a control instruction value and charge/discharge power upon step-down control in the present embodiment 1.

FIG. 10 shows how the relationship between the control instruction value (Duty) upon step-down control and power upon charging or discharging changes depending on the difference |ΔV| between the DC bus voltage of the DC bus 21 and the storage battery voltage of the storage battery 1. As shown in FIG. 10, power decreases as |ΔV| decreases.

The features of step-up control and step-down control as described above in FIGS. 8 to 10 exist not only in the case of using the circuit configuration of the DC/DC conversion circuit 13 described in FIG. 2 and the control signal waveform (switching pattern) of each switching device described in FIGS. 4 to 7, but such characteristics exist in general. As will be described later in detail, the power conversion device of the present invention creatively selects the step-up control method or the step-down control method as appropriate, thereby enabling appropriate processing control of charging and discharging for various types of storage batteries 1 having different voltages, and ensuring an operation in which damage of the storage battery 1 is as small as possible.

Figure 11:
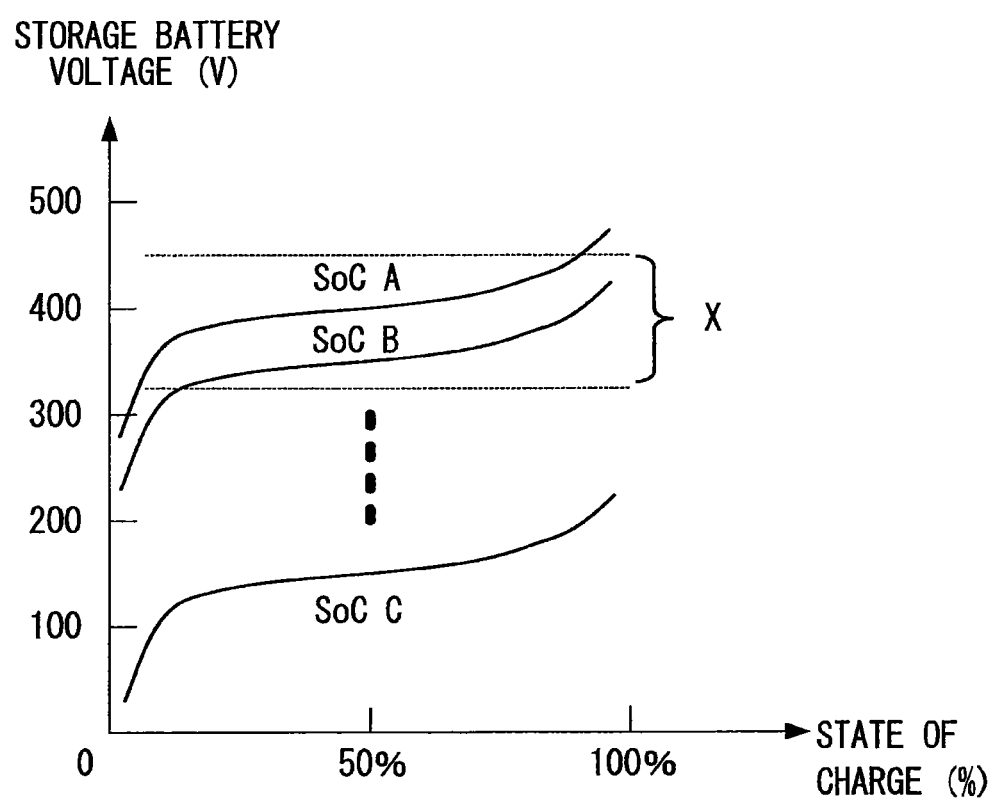
FIG. 11 is a diagram showing the relationship between the states of charge and the voltages of various types of storage batteries to be processed in the present embodiment 1.

FIG. 11 shows the relationship between voltage of each storage battery 1 and the state of charge (hereinafter, referred to as SoC). As shown in FIG. 11, there can be various different characteristics of storage batteries. For example, SoC of each storage battery provided in electric automobiles sold by automobile makers differs depending on vehicle type. In addition, power conversion devices having a storage battery therein are also sold by several companies, and SoC of the storage battery is also different among makers.

In the present embodiment 1, it will be assumed that the DC/DC conversion circuit 13 is connected to various storage batteries having different characteristics (for example, an electric automobile built-in storage battery and a stationary storage battery which are different in SoC). In FIG. 11, an area denoted by a DC bus voltage control range (in FIG. 11, a range indicated by X) indicates a voltage range in which the DC/AC conversion circuit 17 stably operates. Normally, this range is set based on the voltage specifications of the AC system to which the power system 3 and the AC load 4 are connected. As shown in FIG. 11, voltage of a storage battery to be processed does not always fall within the DC bus voltage control range.

Figure 12:
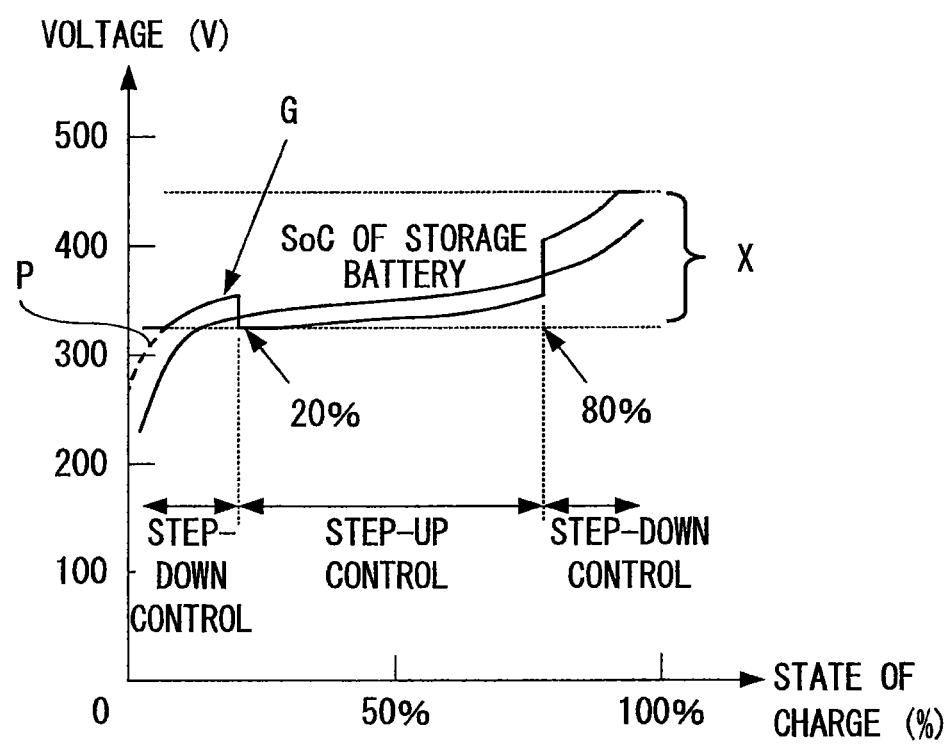
FIG. 12 is a diagram showing an example of the characteristic of the storage battery and DC bus voltage at each value of the state of charge upon charging in the present embodiment 1.

Next, control operation upon charging will be described. In the description, it will be assumed that a storage battery 1 having an SoC characteristic shown in FIG. 12 is used. Here, as a specific example, the control range of DC bus voltage is set at 320V to 450V, and the change range of storage battery voltage of the storage battery 1 and the control range of DC bus voltage almost overlap with each other, but partially, in a range where the state of charge is low, storage battery voltage of the storage battery 1 is below the control range of DC bus voltage.

Figure 13:
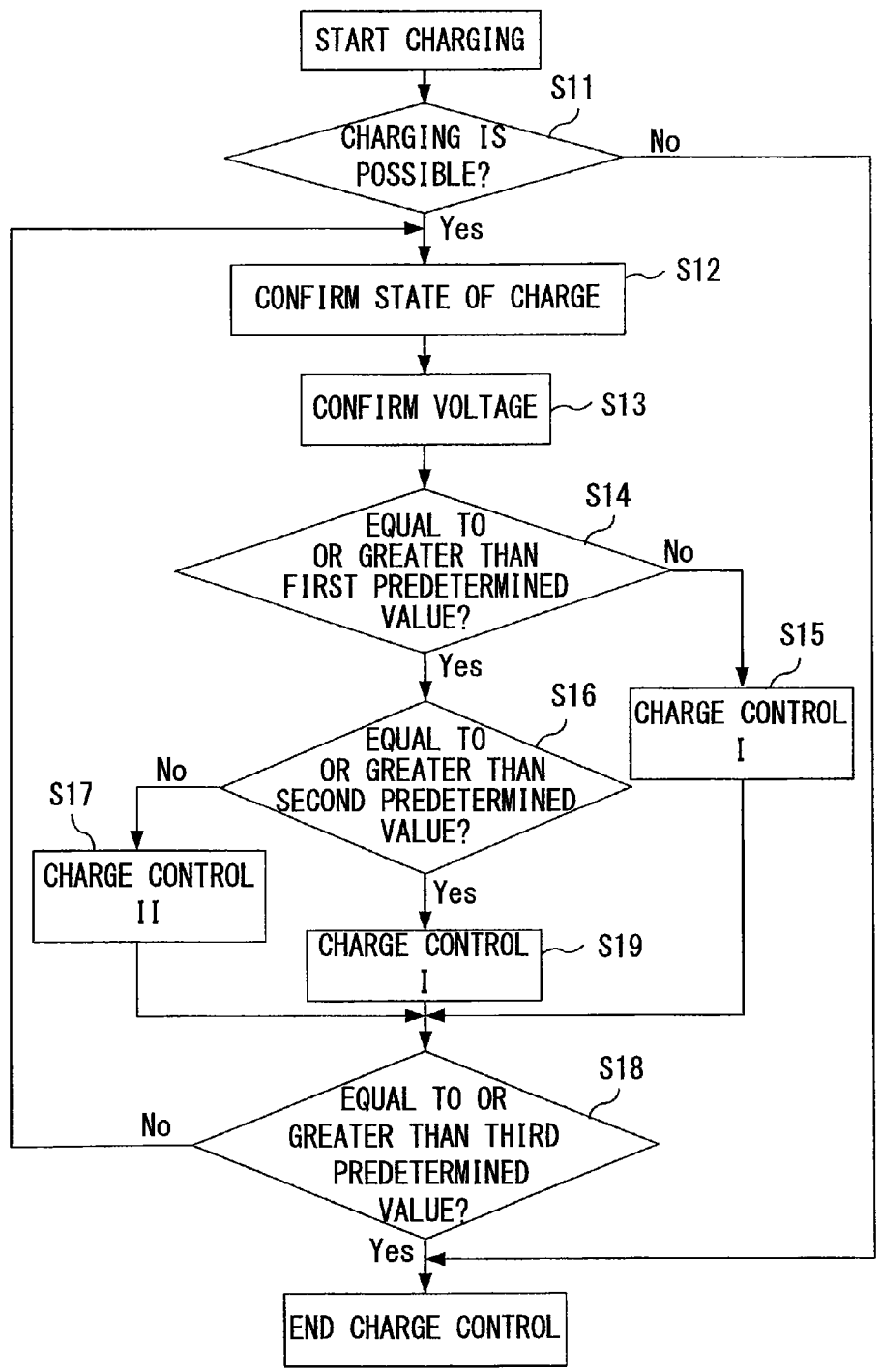
FIG. 13 is a diagram showing a control flow upon charging of the DC/DC control circuit 14 shown in FIG. 3 in the present embodiment 1.

FIG. 13 is a diagram showing a control flow upon charging of the DC/DC control circuit 14.

Hereinafter, with reference to FIG. 13, operation of the DC/DC conversion circuit 13 in accordance with the storage battery control circuit 56 will be described.

It is noted that, for the power conversion device of embodiment 1 of the present invention, although not shown in FIG. 1, for the purpose of saving energy, a power management server (hereinafter, referred to as HEMS: Home Energy Management System) that networks energy consuming equipment in a home such as home electrical appliances and water heater appliances and performs automatic control is set as an uppermost apparatus in the control system, and it will be assumed that the power conversion device operates based on an instruction from the HEMS. Hereinafter, the operation will be described under this assumption.

In FIG. 13, when a charge request is issued to the storage battery 1 from the HEMS described above, the storage battery control circuit 56 in the DC/DC control circuit 14 confirms whether or not the storage battery 1 can be charged (step S11). Specifically, the storage battery control circuit 56 requests the storage battery management unit 2 in the storage battery 1 to report the state of charge and charge possibility information about the storage battery 1. When having received the request, the storage battery management unit 2 reports the possibility of charging and the state of charge to the storage battery control circuit 56. If the storage battery control circuit 56 has received a report that charging is impossible (No in step S11), the storage battery control circuit 56 reports this to the HEMS and waits until the next instruction is issued.

On the other hand, if charging is possible (Yes in step S11), the storage battery control circuit 56 instructs the DC/AC control circuit 18 to establish connection to the power system 3. In the present embodiment 1, it will be assumed that the power conversion device 10 is started by a charge/discharge instruction from the external HEMS, and normally, is stopped for the purpose of power saving. When a start instruction has been received from the storage battery control circuit 56, control for the DC/AC conversion circuit 17 is started so as to attain a predetermined DC bus voltage value (in the present embodiment 1, the central voltage in the DC bus voltage control range X shown in FIG. 12 is an initial value). In the present embodiment 1, DC bus voltage of the DC bus 21 is managed by the DC/AC conversion circuit 17.

The storage battery control circuit 56 monitors a DC bus voltage value outputted from the voltmeter 15, and waits until DC bus voltage of the DC bus 21 reaches predetermined voltage. When the DC bus voltage has reached the predetermined voltage, the storage battery control circuit 56 outputs a charge request to the storage battery management unit 2 in the storage battery 1. When having received the charge request from the storage battery control circuit 56, the storage battery management unit 2 confirms status information about the storage battery 1, and outputs the state of charge, upper limit voltage and lower limit voltage of the storage battery 1, and temperature information, maximum charge current information, the maximum state of charge, and storage battery voltage about the storage battery 1.

When having received the status information about the storage battery 1 from the storage battery management unit 2, the storage battery control circuit 56 confirms the state of charge of the storage battery 1 (step S12).

After having confirmed the state of charge of the storage battery 1 in step S12, the storage battery control circuit 56 confirms storage battery voltage of the storage battery 1 (step S13). In the present embodiment 1, storage battery voltage outputted from the storage battery management unit 2 is used. It is noted that, as a confirmation method for voltage of the storage battery 1, voltage information outputted from the voltmeter 11 may be used. After the storage battery voltage of the storage battery 1 has been confirmed, in step S14, the state of charge of the storage battery 1 is compared with a first predetermined value.

If the state of charge is smaller than the first predetermined value (No in step S14), the DC/DC conversion circuit 13 is controlled based on storage battery charge control I (step S15).

Here, operation in step S14, specifically, operation performed by the storage battery control circuit 56 will be further described. In the present embodiment 1, first, the first predetermined value is set at, for example, 20% in the case where the state of charge in a full charge state is 100%, as show in FIG. 12.

It is noted that in FIG. 13, besides the first predetermined value as a determination threshold value in step S14, as described later, a second predetermined value is set as a determination threshold value in step S16, and further, a third predetermined value is set as a determination threshold value in step S18. In addition, in FIG. 15 described later, a charge current value is adjusted based on temperature information about the storage battery. Therefore, as background for considering these, the characteristic of a storage battery will be briefly described.

For example, a lithium-ion battery used as a storage battery in an electric automobile or a home storage battery system performs charging or discharging of power by chemical reaction. Therefore, for example, in the case of charging the storage battery, when charge current is sharply changed, chemical reaction does not follow the change in the charge current and metal lithium precipitates, so that the storage battery is deteriorated. Also, if the storage battery is charged at a high temperature, deterioration of the storage battery progresses. In the case of lithium-ion battery, also upon discharging, if discharge power is sharply changed or power is discharged at a high temperature, deterioration of the storage battery progresses though not to the extent upon charging. Further, in the case of lithium-ion battery, if the storage battery fully discharges power or is overcharged (normally, charging is performed up to about 90 to 95% of a full charge state), deterioration or breakage of the storage battery progresses.

In conventional power conversion devices, a charge control method is not changed depending on, for example, charge current control at the start of charging, the state of charge charged in the storage battery and the temperature of the storage battery, or the like. Therefore the storage battery is deteriorated due to charge current sharply flowing at the start of charging, and charge current becomes excessively large in the state where the temperature (cell temperature) of the storage battery is high, whereby the storage battery is damaged more than necessary, thus a problem exists in that the battery life is shortened.

Similarly, in conventional power conversion devices, a discharge control method is not changed depending on discharge power control at the start of discharging, the state of charge charged in the storage battery, and the temperature of the storage battery, or the like. Therefore the storage battery is deteriorated due to sharp change in discharge power upon discharging, and discharge power becomes excessively large in the state where the temperature (cell temperature) of the storage battery is high, whereby the storage battery is damaged more than necessary, thus a problem exists in that the battery life is shortened.

The power conversion device according to embodiment 1 enables appropriate processing control of charging and discharging for various types of storage batteries, and selects and switches a control method as appropriate in accordance with the processing condition. Thereby the power conversion device according to embodiment 1 prevents damage of the storage battery to be processed as much as possible.

Returning to step S15 in FIG. 13, at a stage where the state of charge of the storage battery 1 is less than 20%, it is desirable to smoothly start a charge operation with comparatively small charge power, in order to prevent damage of the storage battery 1. Therefore, as described in FIGS. 8 to 10, a method of performing charging by step-down control is more suitable, and therefore the charge step-down control method is selected. That is, the storage battery charge control I executed in step S15 corresponds to charge step-down control shown in FIG. 14 described later.

It is noted that the charge control method by the storage battery control circuit 56 is performed with two stages. That is, in the case where the charge step-down control method is selected as described above, if a control target value of DC bus voltage set based thereon falls within the control range of DC bus voltage, the selected charge step-down control method is kept to be performed, and on the other hand, if the control target value does not fall within the control range X of DC bus voltage, a control method different from the selected charge step-down control method is selected.

It is noted that the storage battery 1 used as a charging target here is the one having the characteristic shown in FIG. 12, and as described later, a control target value G of DC bus voltage set based on the selected charge step-down control method falls within the control range X of DC bus voltage. Therefore, in this case, operation by the selected charge step-down control method is kept to be performed.

In the following description, the case where the operation by the selected charge step-down control method is inverted (that is, step-down changes to step-up or step-up changes to step-down) will be described using the case of charging storage batteries having characteristics shown in FIGS. 19 and 20. Hereinafter, the operation by the selected charge step-down control in the case of No in step S14 will be described with reference to FIG. 14.

When the storage battery charge control I, that is, the charge step-down control has been selected, the storage battery control circuit 56 calculates a control target value of DC bus voltage of the DC bus 21 based on storage battery voltage of the storage battery 1 outputted from the voltmeter 11. As shown in FIG. 12, when the state of charge of the storage battery 1 is smaller than the first predetermined value, the storage battery 1 is charged by the step-down control method shown in FIG. 5. In the case where charging is performed by step-down control, as shown in FIG. 10, the maximum power that can be supplied to the storage battery 1 is determined by the difference between the DC bus voltage and the storage battery voltage of the storage battery 1. Therefore, the control target value of DC bus voltage is determined so as to attain the voltage difference that can secure predetermined charge power (step S31).

It is noted that as shown in the leftmost end of FIG. 12, in the case (part indicated by a dotted line P in FIG. 12) where the control target value G of DC bus voltage set based on the voltage difference described above is below the control range X of DC bus control voltage, lower limit voltage of the control range of DC bus control voltage is set as a control target value of DC bus voltage.

Although in the present embodiment 1, the target value of DC bus voltage is calculated such that the difference from storage battery voltage of the storage battery 1 becomes constant, the present invention is not limited thereto. For example, needless to say, when the storage battery charge control I is selected, the control target value of DC bus voltage may be set at a predetermined value (constant value).

After the control target value of DC bus voltage has been determined in the above-described manner, the storage battery control circuit 56 outputs the control target value of DC bus voltage to the DC/AC control circuit 18. When having received the control target value of DC bus voltage, the DC/AC control circuit 18 starts control so as to make DC bus voltage of the DC bus 21 be the control target value. After the control target value of DC bus voltage has been calculated in step S31, a target value of charge current is calculated in step S32. In the present embodiment 1, it will be assumed that a target instruction value of charge current to the storage battery 1 and temperature information about a cell in the storage battery 1 are reported from the storage battery management unit 2 to the storage battery control circuit 56.

It is noted that the target instruction value of charge current is set at, for example, the smaller one of upper limit values of currents that can be applied in the storage battery 1 and the power conversion device 10, based on their performances.

Figure 14:
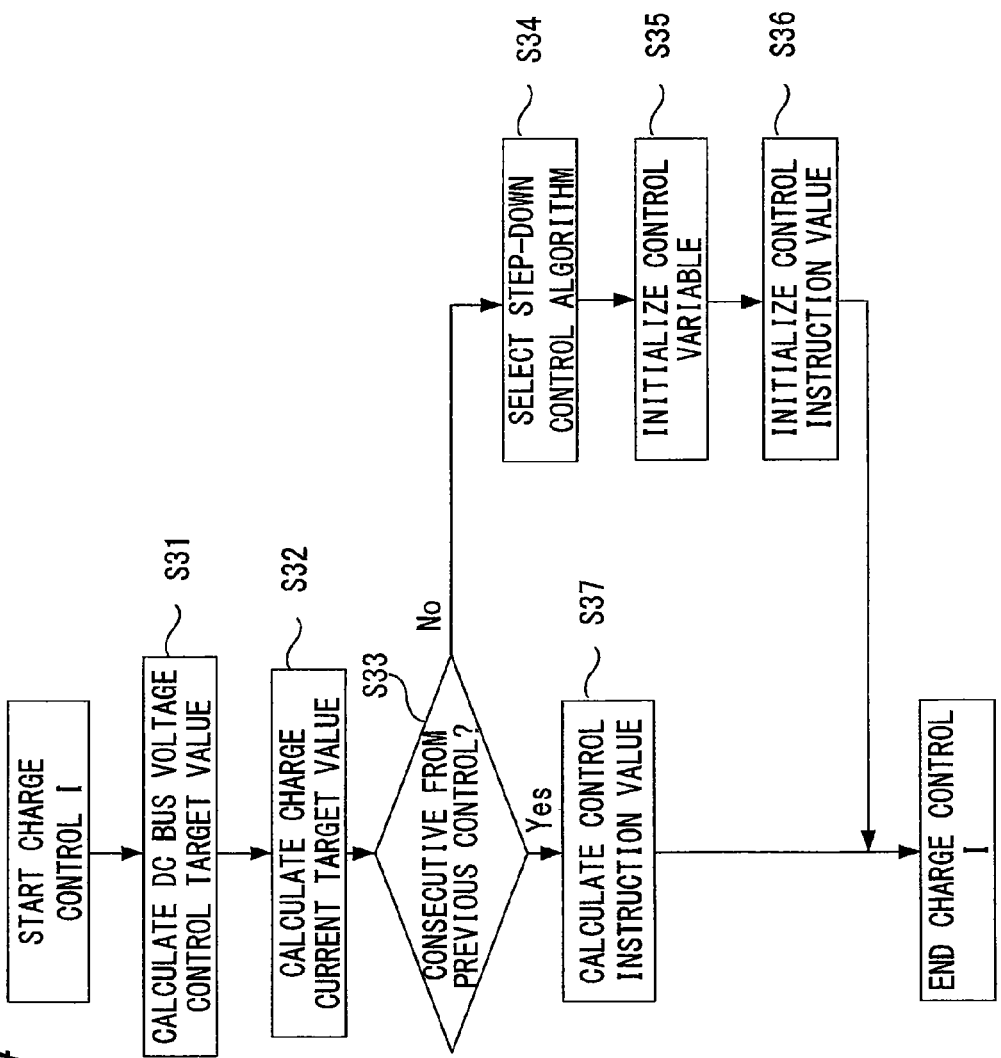
FIG. 14 is a diagram showing a control flow of storage battery charge control I (step S15) shown in FIG. 13.
Figure 15:
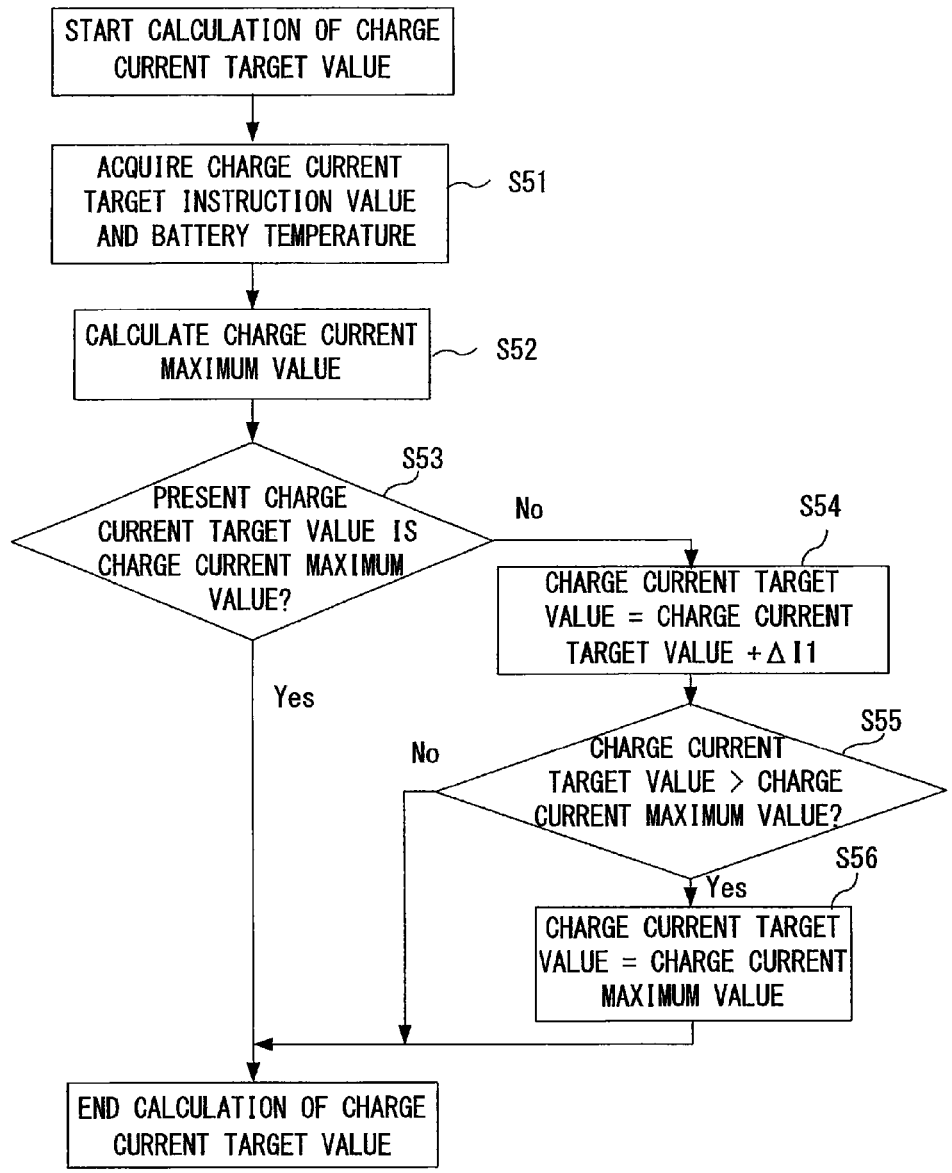
FIG. 15 is a diagram showing a control flow of charge current target value calculation (step S32) shown in FIG. 14.

FIG. 15 shows an operation for calculating the target value of charge current shown in step S32 in FIG. 14.

After having acquired the target instruction value of charge current to the storage battery 1 and the battery temperature information from the storage battery management unit 2 in step S51, the storage battery control circuit 56 calculates the maximum value of charge current based on the temperature condition in step S52. That is, considering the temperature characteristic of the storage battery 1, a limit value of tolerable current that does not cause abnormal deterioration or damage at the present temperature is calculated as the charge current maximum value.

In the present embodiment 1, charge current maximum values in various temperature conditions and various values of the SoC are stored in a memory (not shown) in the storage battery control circuit 56, and the maximum value of charge current is calculated based on the stored values.

After having calculated the maximum value of charge current in each temperature condition in step S52, the storage battery control circuit 56 confirms whether or not the present target value of charge current coincides with the maximum value of charge current in step S53. Then, if the present target value of charge current coincides with the maximum value of charge current (Yes in step S53), the present target value of charge current is outputted as it is, even when the present target value of charge current has not reached the target instruction value.

On the other hand, if the present target value does not coincide with the maximum value of charge current (No in step S53), ΔI1 is added to the present control target value of charge current (step S54). After the target value of charge current has been calculated in step S54, the calculated target value is compared again with the maximum value of charge current calculated in step S52, in step S55. Then, if the target value is equal to or smaller than the maximum value (No in step S55), the charge current target value calculated in step S54 is outputted. On the other hand, if the target value is greater than the maximum value (Yes in step S55), the target value of charge current is set to the maximum value of charge current and then outputted in step S56.

The present target value of charge current is set at a sufficiently low value such as zero, at the start of control operation. Therefore, while the operation based on the flow shown in FIG. 13 is continued, the target value is gradually increased based on the added value of ΔI1, and finally reaches the charge current target instruction value (in case of charge current target instruction value<charge current maximum value) or the charge current maximum value (in case of charge current target instruction value≥charge current maximum value). It is noted that in claims of the present application, the reached value is referred to as a current control target value.

As described above, in the present embodiment 1, as shown in FIG. 15, in the calculation of the target value of charge current, the target value of charge current is not immediately set to the above-described current control target value, but is gradually increased based on the predetermined value of ΔI1. The reason is as follows. That is, as described above, for example, in the case of using a lithium-ion battery as the storage battery 1, charging of power is performed by chemical reaction. Therefore, when charge current is sharply changed, chemical reaction does not follow the change in the charge current and metal lithium precipitates, so that the storage battery 1 is deteriorated. Also, if the storage battery 1 is charged at a high temperature, deterioration of the storage battery 1 progresses (if charge current is large, the amount of heat generation upon charging increases and further, the cell temperature of the battery increases, so that deterioration of the storage battery 1 progresses).

Therefore, in the present embodiment 1, by gradually increasing charge current to the storage battery 1, load on the storage battery 1 upon charging is minimized, whereby deterioration of the storage battery 1 can be minimized. That is, the value of ΔI1 to be added is set so that charge current increases from its initial value to the above-described current control target value at a rate of predetermined time constant determined by taking the withstand level of the storage battery 1 into consideration.

Although ΔI1 is the same value at each temperature in the present embodiment 1, the present invention is not limited thereto. It should be understood that the same effect is provided even in the case of performing control while changing the value of ΔI1 for each temperature of the storage battery 1. In the present embodiment 1, the charge current maximum value upon charging is changed depending on the temperature of the storage battery 1, whereby deterioration of the storage battery 1 can be minimized. This operation in which the temperature of the storage battery 1 is taken into consideration will be further described with reference to FIG. 18 and the like later.

Returning to FIG. 14, after having calculated the target value of charge current in step S32, the storage battery control circuit 56 confirms whether or not the step-down control upon charging, selected at the present time, is consecutively performed from the previous time, in step S33. If the control is not consecutively performed from the previous time (No in step S33 in a case such as the first control after the charge control method has been switched or the first control after charging has been started), a step-down control algorithm for charging is selected in step S34, and control variables are initialized in step S35. After the control variables have been initialized, the control instruction value is initialized in step S36, and the initialized control instruction value is reported to the charge step-down control circuit 52 (FIG. 3), and the switch circuit 55 is instructed to select output of the charge step-down control circuit 52.

In the case of switching the control method between step-up control and step-down control, if the control instruction value used in the control method just before the switching is left, extremely large current flows instantaneously when the operation is started by the control method just after the switching. Such inconvenience is resolved by the above initialization processing.

If the determination in step S33 is Yes, that is, the control is consecutively performed from the previous control method, the control instruction value is calculated using the charge current target value calculated in step S32 as a control target (step S37). After having calculated the control instruction value in step S37, the storage battery control circuit 56 reports the calculated control instruction value to the charge step-down control circuit 52. When having received the control instruction value, the charge step-down control circuit 52 outputs control signals for controlling the switching devices 31*a* to 31*d* and 32*a* to 32*d* based on the instruction value (see FIG. 5).

Returning to FIG. 13, after the storage battery charge control I has been completed in step S15, the storage battery control circuit 56 confirms whether or not the state of charge of the storage battery 1 is equal to or greater than the third predetermined value in step S18. It is noted that the third predetermined value for the state of charge is set in order to prevent overcharge of the storage battery 1. For example, the third predetermined value is set at 95% of the state of charge in a full charge state.

If the state of charge is smaller than the third predetermined value, the process returns to step S12 to continue the subsequent charge control in accordance with the flow shown in FIG. 13. If the state of charge is equal to or greater than the third predetermined value (Yes in step S18), the charge control is ended. Thus, deterioration of the storage battery 1 due to overcharge can be reliably prevented.

While charging is performed by the storage battery charge control I (step-down control) shown in step S15, if the state of charge of the storage battery 1 has become equal to or greater than the first predetermined value in step S14, the storage battery control circuit 56 compares the state of charge of the storage battery 1 with the second predetermined value in step S16. As a result of the comparison, if the state of charge is smaller than the second predetermined value (No in step S16), storage battery charge control II (step-up control) is selected in step S17.

The reason is as follows. That is, upon charging by step-down control, as shown in FIG. 8, the maximum power amount by which charging can be performed cannot be sufficiently secured as compared to the case of charging by step-up control. Therefore, in the present embodiment 1, as shown in FIG. 12, in a range where the SoC is low and battery voltage of the storage battery 1 is low, charging by step-down control is performed, thereby increasing storage battery voltage of the storage battery 1 to voltage that allows step-up control. Then, when the storage battery voltage has been increased to the voltage that allows step-up control, the charge method for the storage battery 1 is switched to the step-up control method, whereby the maximum power that can charge the storage battery 1 is secured. Thus, the charging time can be reduced.

Figure 16:
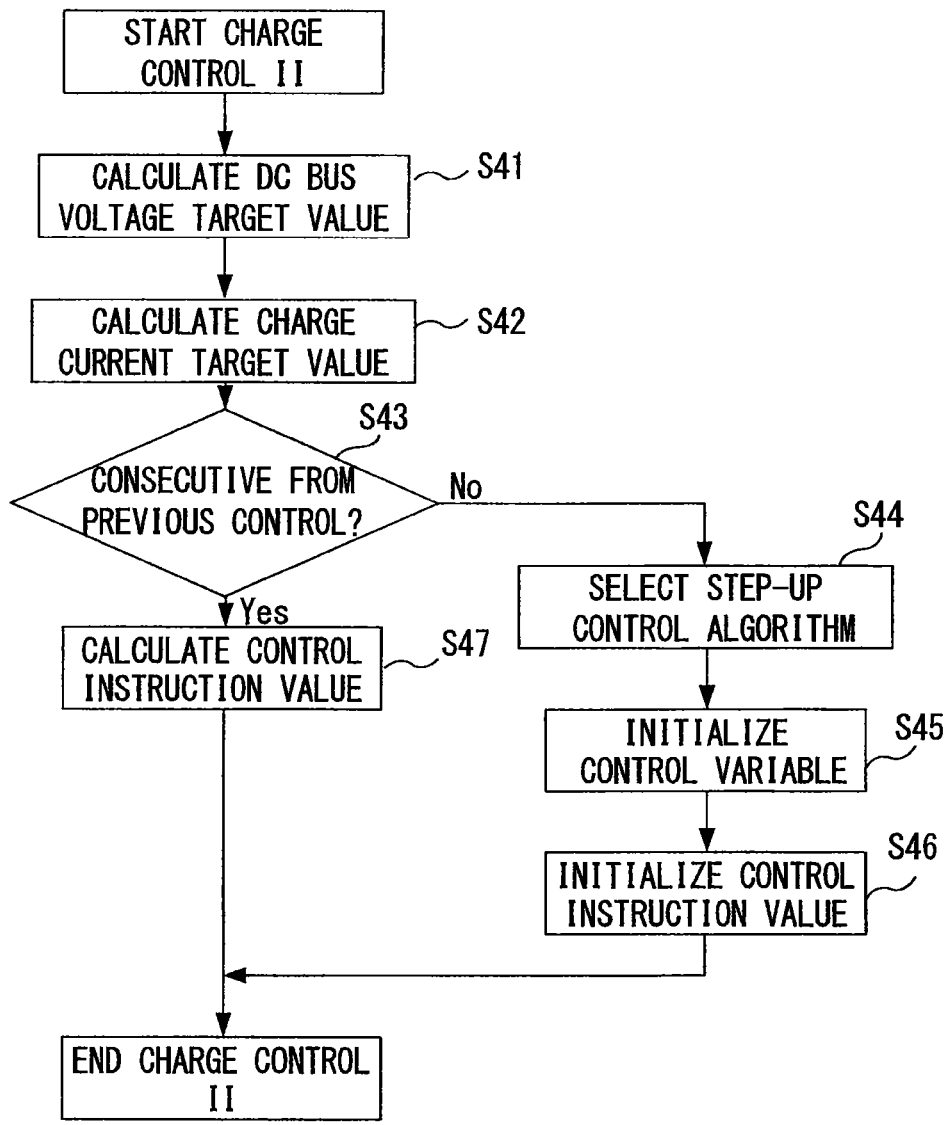
FIG. 16 is a diagram showing a control flow of storage battery charge control II (step S17) shown in FIG. 13.

When the storage battery charge control II has been selected in step S17, in FIG. 16, the storage battery control circuit 56 calculates the target vale of DC bus voltage of the DC bus 21 in step S41, as in the case where the storage battery charge control I is selected. In the case where charging is performed by step-up control, as shown in FIG. 9, the maximum power that can be supplied to the storage battery 1 is determined by the difference between DC bus voltage and storage battery voltage of the storage battery 1. Therefore, the control target value of DC bus voltage is determined so as to attain the voltage difference that can secure predetermined charge power (step S41). It is noted that, in the case where the control target value of DC bus voltage is below the control range of DC bus voltage, lower limit voltage of the control range of DC bus voltage is set as the control target value of DC bus voltage, and in the case where the control target value of DC bus voltage is above the control range of DC bus voltage, upper limit voltage of the control range of DC bus voltage is set as the control target value of DC bus voltage.

Here, the storage battery 1 having the characteristic shown in FIG. 12 is an object to be processed, the step-up control method is selected, and the control target value of DC bus voltage set based on the step-up control method can be made to fall within the control range of DC bus voltage. Therefore, as in the description in step S14, the charge step-up control method is kept to be performed in any case.

In the present embodiment 1, also in step-up control, as in the case of step-down control, the target value of DC bus voltage is calculated so as to make the difference from the battery voltage of the storage battery 1 constant. However, the present invention is not limited thereto. For example, needless to say, when the storage battery charge control II is selected, the control target value of DC bus voltage may be set at a predetermined value (constant value).

When the control target value of DC bus voltage has been determined in the above-described manner, the storage battery control circuit 56 outputs the control target value of DC bus voltage to the DC/AC control circuit 18. When having received the control target value of DC bus voltage, the DC/AC control circuit 18 starts control so as to make DC bus voltage of the DC bus 21 be the control target value. After the control target value of DC bus voltage has been calculated in step S41, a target value of charge current is calculated in step S42. In the present embodiment 1, the calculation is the same as in the case of the storage battery charge control I, so the detailed description thereof is omitted.

After having calculated the target value of charge current in step S42, the storage battery control circuit 56 confirms whether or not the step-up control upon charging, selected at the present time, is consecutively performed from the previous time, in step S43. If the control is not consecutively performed from the previous time (No in step S43 in a case such as the first control after the charge control method has been switched or the first control after charging has been started), a step-up control algorithm for charging is selected in step S44, and control variables are initialized in step S45. After the control variables have been initialized, the control instruction value is initialized in step S46, and the initialized control instruction value is reported to the charge step-up control circuit 51, and the switch circuit 55 is instructed to select output of the charge step-up control circuit 51.

If the control is consecutively performed from the previous control in step S43, the control instruction value is calculated using the charge current target value calculated in step S42 as a control target (step S47). After having calculated the control instruction value in step S47, the storage battery control circuit 56 reports the calculated control instruction value to the charge step-up control circuit 51. When having received the control instruction value, the charge step-up control circuit 51 outputs control signals for controlling the switching devices 31a to 31d and 32a to 32d based on the instruction value (see FIG. 4). Returning to FIG. 13, after the storage battery charge control II has been completed in step S17, the storage battery control circuit 56 confirms whether or not the state of charge of the storage battery 1 is equal to or greater than the third predetermined value in step S18. Then, if the state of charge is smaller than the third predetermined value (No in step S18), the process returns to step S12 to continue the subsequent charge control in accordance with the flow shown in FIG. 13.

In the case of Yes in step S18, as described above, the charge control is ended in order to prevent overcharge.

While charging by the storage battery charge control II shown in step S17 is performed, if the state of charge of the storage battery 1 has become equal to or greater than the second predetermined value in step S16, the storage battery control circuit 56 selects the storage battery charge control I (step-down control) in step S19. The reason is as follows. As described above, for example, in the case where a lithium-ion battery used in an electric automobile or a home storage battery system is used as the storage battery 1, if the storage battery 1 is overcharged (normally, charging is performed up to about 90 to 95% of a full charge state), deterioration or breakage of the storage battery progresses. Therefore, in the present embodiment 1, if the state of charge has become equal to or greater than a predetermined value, that is, the second predetermined value (here, for example, set at 80%) below the third predetermined value which is a final threshold value for preventing overcharge, the target value of charge current is decreased in accordance with the state of charge, and the control method is switched to the step-down control having a comparatively mild output characteristic described in FIG. 8, whereby overcharge is further reliably prevented.

When the storage battery charge control I has been selected (step S19), as described above, the storage battery control circuit 56 calculates the control target value of DC bus voltage of the DC bus 21 based on storage battery voltage of the storage battery 1 outputted from the voltmeter 11. As shown in FIG. 12, in the case where the state of charge of the storage battery 1 is equal to or greater than the second predetermined value and is smaller than the third predetermined value, as described above, in order to prevent overcharge to the storage battery 1, charge current is gradually decreased and the charge control method is switched to the step-down control method shown in FIG. 5. In step S31 in FIG. 14, the control target value of DC bus voltage is determined so as to attain the voltage difference that can secure predetermined charge power. At this time, if the control target value of DC bus voltage is above the control range of DC bus control voltage, upper limit voltage of the control range of DC bus voltage is set as the control target value of DC bus voltage.

After the control target value of DC bus voltage has been determined in the above-described manner, the storage battery control circuit 56 outputs the control target value of DC bus voltage to the DC/AC control circuit 18. When having received the control target value of DC bus voltage, the DC/AC control circuit 18 starts control so as to make DC bus voltage of the DC bus 21 be the control target value. After the control target value of DC bus voltage has been calculated in step S31, a target value of charge current is calculated in step S32. Further, after the charge current target value and the battery temperature have been acquired in step S51 in FIG. 15, the storage battery control circuit 56 calculates the maximum value of charge current based on each temperature condition in step S52. In the present embodiment 1, the maximum charge currents at various temperature conditions and various values of SoC are stored in a memory in the storage battery control circuit 56, and the maximum value of charge current is calculated based on the stored values. It is noted that in the present embodiment 1, the values are stored in advance in the memory such that the charge current amount is restricted in the condition where the SoC is high.

After having calculated the maximum value of charge current in each temperature condition in step S52, the storage battery control circuit 56 confirms whether or not the present target value of charge current coincides with the maximum value of charge current (step S53). Then, if the present target value of charge current coincides with the maximum value of charge current, the present target value of charge current is outputted as it is. On the other hand, if the present target value does not coincide with the maximum value, $\Delta I1$ is added to the present control target value of charge current (step S54). After the target value of charge current has been calculated in step S54, the calculated target value is compared again with the maximum value of charge current calculated in step S52, in step S55. Then, if the target value is equal to or smaller than the maximum value, the charge current target value calculated in step S54 is outputted. On the other hand, if the target value is greater than the maximum value, the target value of charge current is set to the maximum value of charge current and then outputted in step S56.

After having calculated the target value of charge current in step S32 in FIG. 14, the storage battery control circuit 56 confirms whether or not the step-down control upon charging, selected at the present time, is consecutively performed from the previous time, in step S33. If the control is not consecutively performed from the previous time (a case such as the first control after the charge control method has been switched or the first control after charging has been started), a step-down control algorithm for charging is selected in step S34, and control variables are initialized in step S35. After the control variables have been initialized, the control instruction value is initialized in step S36, and the initialized control instruction value is reported to the charge step-down control circuit 52, and the switch circuit 55 is instructed to select output of the charge step-down control circuit 52.

In the present embodiment 1, control signals for control instruction values to be outputted to the switching devices 31a to 31d and 32a to 32d are completely different between the step-up control and the step-down control. Therefore, control is performed such that charge current is gradually increased after charge power is set to zero once, and then at the time when the charge current has exceeded the maximum charge current, the maximum charge current value calculated in step S52 is outputted as a target value. The subsequent control is the same as in step S15, so the description thereof is omitted. Then, while charging by the storage battery charge control I shown in step S19 is performed, when the state of charge of the storage battery 1 has become equal to or greater than the third predetermined value in step S18, the storage battery control circuit 56 ends the charge control for the storage battery 1.

It is noted that when the state of charge of the storage battery 1 has become equal to or greater than the third predetermined value, the storage battery control circuit 56 determines that the storage battery 1 has been fully charged, and reports the HEMS that charging is impossible, and also, outputs a stop request to the DC/AC control circuit 18 and waits until reception of the next instruction.

Figure 17:
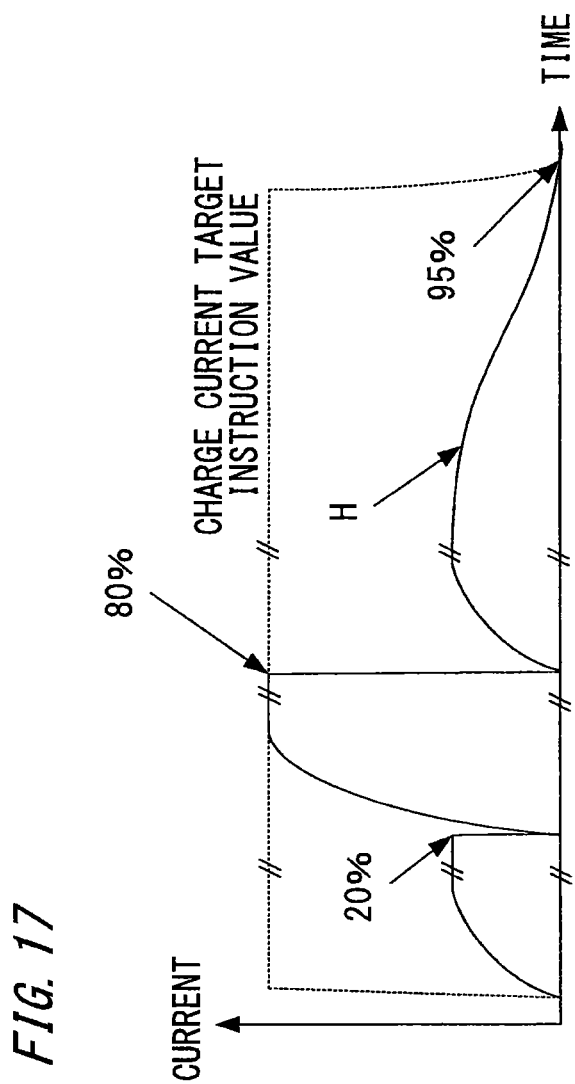
FIG. 17 is a diagram showing charge current in the case of charging the storage battery having the characteristic shown in FIG. 12 at a predetermined temperature or lower in the present embodiment 1.

FIG. 17 shows the relationship between charge current H and time in the case of performing charging when the storage battery 1 is at an ordinary temperature. As shown in FIG. 17, at the start of charging, charging is performed by step-down control until the SoC becomes a predetermined value (in the present embodiment 1, 20% of the state of charge in a full charge state), and then, when this charging is completed, the control is switched to step-up control. Then, when charging has been further performed to reach a predetermined value of the state of charge (in the present embodiment 1, 80% of the state of charge in a full charge state), the control is switched to step-down control again, and then charging is performed to reach a predetermined value of the state of charge (in the present embodiment 1, 95% of the state of charge in a full charge state).

As described above, in the power conversion device of embodiment 1, upon charging of the storage battery 1, the charge control method for the storage battery 1, the maximum charge current amount for the storage battery 1, and the DC bus voltage target value for the DC bus 21 are switched based on the state of charge (SoC) of the storage battery 1, the temperature of the storage battery 1 (cell temperature), and the battery voltage of the storage battery 1, thus providing an effect of ensuring the maximum charge power amount for the storage battery 1 and minimizing deterioration of the storage battery 1.

In addition, in the present embodiment 1, basically, when the maximum power is ensured and DC bus voltage of the DC bus 21 is within the control range, charge control is performed by step-down control. The reason is as follows. As shown in FIGS. 4 and 6, in the case of step-up control, the switching devices 31a to 31d and 32a to 32d always perform switching. On the other hand, in the case of step-down control, as shown in FIGS. 5 and 7, one of the set of switching devices 31a to 31d and the set of the switching devices 32a to 32d does not perform switching but only operates as a diode rectification device. Therefore, in step-down control, switching loss of the switching devices is smaller, and therefore power conversion can be performed efficiently. Therefore, in embodiment 1, charge/discharge control by unnecessary step-up control is suppressed, whereby an effect is provided that unnecessary power conversion loss is suppressed and charge/discharge control for the storage battery 1 can be efficiently performed.

Figure 18:
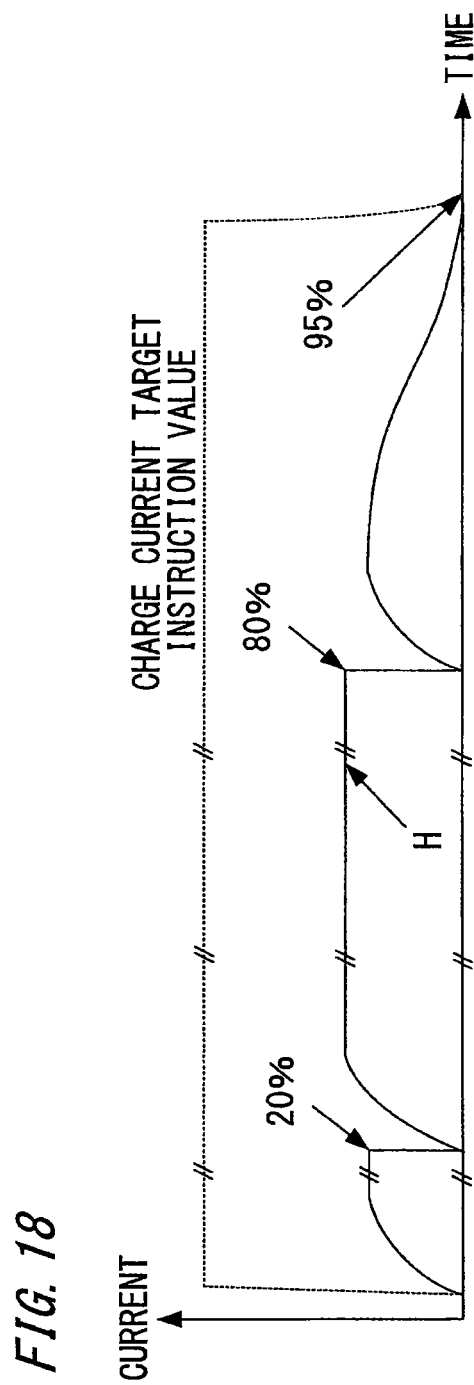
FIG. 18 is a diagram showing charge current in the case of charging the storage battery having the characteristic shown in FIG. 12 at a predetermined temperature or higher in the present embodiment 1.

Next, FIG. 18 shows the relationship between charge current H and time in the case of performing charging when the storage battery 1 is at a high temperature. As shown in FIG. 18, at the start of charging, charging is performed by step-down control until the SoC becomes a predetermined value (in the present embodiment 1, 20% of the state of charge in a full charge state), and then, when this charging is completed, the control is switched to step-up control. In the step-up control, the maximum charge current is set to be small because of the high temperature, and therefore is lower than the charge current in the ordinary case. Then, when charging has been further performed to reach a predetermined value of the state of charge (in the present embodiment 1, 80% of the state of charge in a full charge state), the control is switched to step-down control again, and then charging is performed to reach a predetermined value of the state of charge (in the present embodiment 1, 95% of the state of charge in a full charge state). Thus, also at a high temperature, an effect is provided that charging can be performed while deterioration of the storage battery 1 is minimized.

It is noted that FIG. 18 has shown the case where the maximum charge current (charge current target instruction value) is greater than the maximum charge current (step-down maximum charge current value) that can be controlled upon step-down control. However, the present invention is not limited thereto. In the case where the maximum charge current is smaller than the step-down maximum charge current value that can be controlled upon step-down control, control is performed by step-down control without switching the control method. Thus, an effect is provided that interruption of charge control due to the control switching can be eliminated, power conversion loss due to switching can be suppressed, and deterioration of the storage battery 1 can be minimized.

Figure 19:
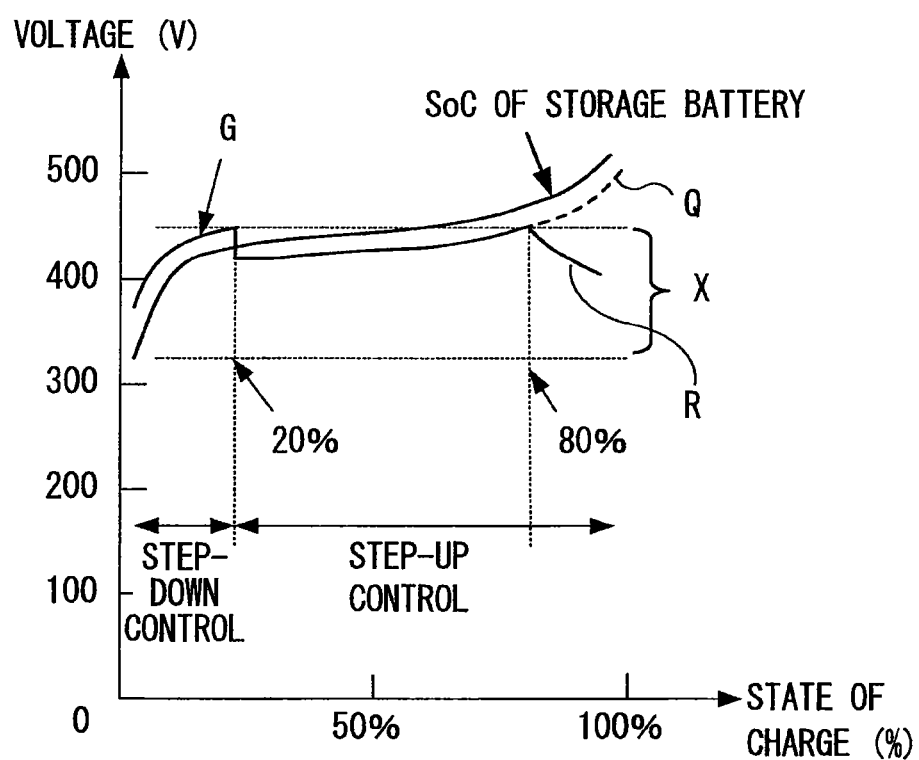
FIG. 19 is a diagram showing an example of the characteristic of another storage battery different from that in FIG. 12 and DC bus voltage at each value of the state of charge upon charging in the present embodiment 1.

In addition, FIG. 19 shows DC bus voltage at each state of charge and a control method for the DC/DC conversion circuit 13 upon charging of the storage battery 1 having an SoC characteristic different from that in FIG. 12. As shown in FIG. 19, the case where the SoC characteristic covers the control range X of DC bus voltage and also voltage above this range will be described. In this example, when the state of charge of the storage battery 1 is lower than the first predetermined value and the control target value G of DC bus voltage in step-down control is within the control range X of DC bus voltage, charging is performed by step-down control as in the operation described in FIG. 12. The calculation method for DC bus voltage in the step-down control is the same as in the case of FIG. 12, so the description thereof is omitted.

On the other hand, when the control target value G of DC bus voltage in step-down control exceeds the control range X of DC bus voltage, that is, when the charge step-down control method is selected and the control target value of DC bus voltage set based thereon does not fall within the control range of DC bus voltage, unlike the operation described in FIG. 12, the charge control method is switched to step-up control which is not step-down control, even if the state of charge of the storage battery 1 is lower than the first predetermined value. That is, the operation is inverted. In the step-up control, as in the case shown in FIG. 12, the control target value of DC bus voltage is calculated so as to secure a predetermined charge power amount.

Then, when the state of charge of the storage battery 1 has become equal to or greater than the second predetermined value, although in the case of the storage battery 1 having the SoC characteristic shown in FIG. 12, charging by step-down control is continued, in the case of the storage battery 1 having the SoC characteristic shown in FIG. 19, the control target value G of DC bus voltage does not fall within the control range (part indicated by a dotted line Q in FIG. 19), and therefore step-up control is selected unlike the step-down control described in the operation in FIG. 12. Eventually, the step-up control is continued without being changed, to perform charging of the storage battery 1. That is, in this case, the operation when the state of charge is equal to or greater than the second predetermined value is inverted from step-down to step-up as compared to the operation in FIG. 12. At this time, since the state of charge is high, in the present embodiment 1, the control target value of DC bus voltage is decreased as indicated by a solid line R in FIG. 19, thus performing control so as to restrict the supply maximum power in step-up control. Thus, an effect is provided that the supply maximum power can be suppressed, the amplitude of ripple of charge current caused due to disturbance or the like can also be suppressed, and deterioration of the storage battery 1 due to current ripple can be suppressed.

Figure 20:
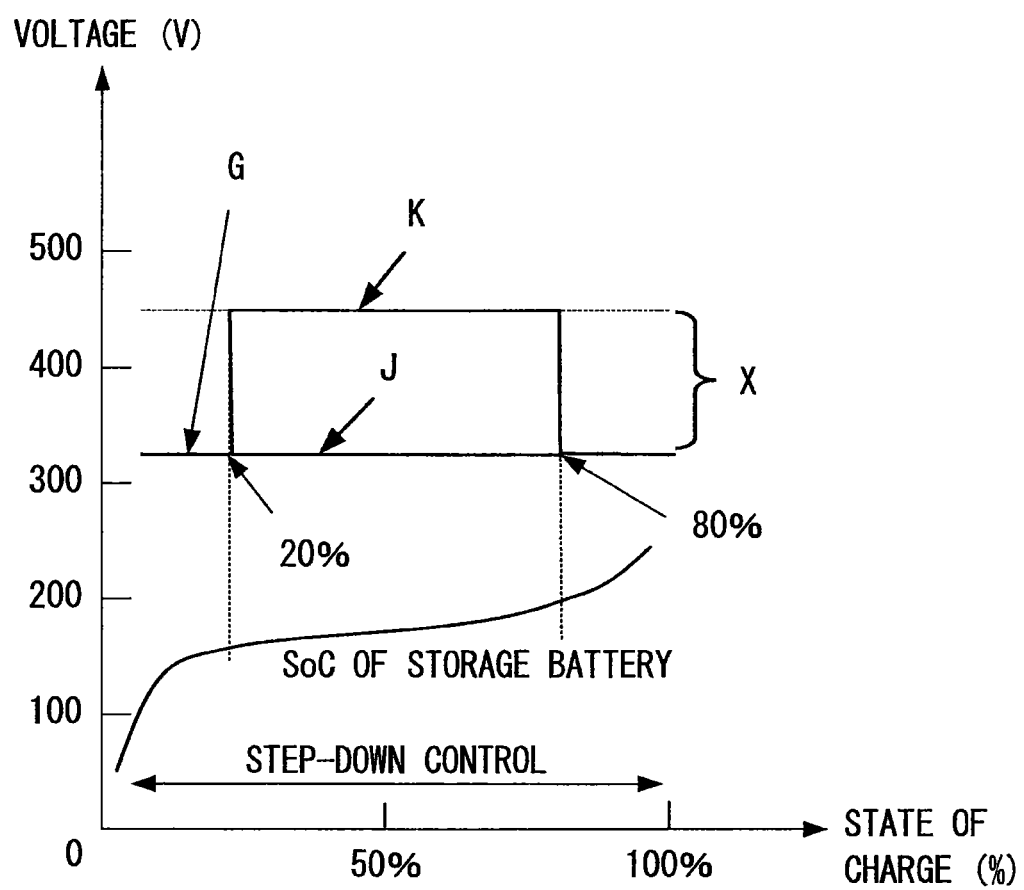
FIG. 20 is a diagram showing an example of the characteristic of still another different storage battery and DC bus voltage at each value of the state of charge upon charging in the present embodiment 1.

FIG. 20 shows DC bus voltage at each state of charge and a control method for the DC/DC conversion circuit 13 upon charging of the storage battery 1 having another different SoC characteristic. As shown in FIG. 20, the case where the SoC characteristic is below the DC bus voltage control range will be described. In this example, since the state of charge of the storage battery 1 is lower than the first predetermined value, charging is performed by step-down control. At this time, DC bus voltage of the DC bus 21 is controlled in order to secure the maximum charge current. In FIG. 20, since the maximum charge current can be sufficiently secured, the control target value G of the DC bus voltage is set at lower limit voltage of the DC bus voltage control range X. On the other hand, when the state of charge of the storage battery 1 has become equal to or greater than the first predetermined value, the storage battery control circuit 56 confirms the maximum charge current amount. At this time, if there is plenty of time for charging, the control is continued without change while the control target value G of DC bus voltage is kept at the lower limit voltage of the DC bus voltage control range X (normal charge case J), or if it is desired to shorten the charging time (fast charge case K), the control target value of DC bus voltage is controlled to be upper limit voltage of the DC bus voltage control range. In the case of charging the storage battery 1 having the SoC characteristic shown in FIG. 20, since the control target value of DC bus voltage is always greater than storage battery voltage of the storage battery 1, step-down control is always performed. Therefore, step-down control is performed even in a range in which the state of charge is between the first predetermined value and the second predetermined value. Thus, the operation is inverted in this range as compared to the case of FIG. 12.

It is noted that in the case of changing the control target value of DC bus voltage, the control target value is not sharply changed from the lower limit voltage of the DC bus voltage control range to the upper limit voltage of the DC bus voltage control range, but the control target value is gradually changed on a predetermined voltage step basis. The reason is as follows. In the case of controlling the storage battery 1 having the SoC characteristic shown in FIG. 12, since the control is switched from step-down control to step-up control or from step-up control to step-down control, charge current is controlled so as not to apply load onto the storage battery 1 at the time of the control switching. However, in the case of controlling the storage battery 1 having the SoC characteristic shown in FIG. 20, since only the control target value is changed while the step-down control is kept, if the control target value is sharply changed, large charge current (overcurrent) might be supplied to the storage battery 1. Therefore, in the present embodiment 1, the control target voltage is gradually increased on a predetermined voltage step basis, whereby overcurrent is suppressed. Thus, an effect is provided that deterioration of the storage battery 1 due to overcurrent can be suppressed. It is noted that, needless to say, in the case of changing the control target value of DC bus voltage, if the voltage value is controlled so as to be gradually changed as described above, the control can be performed without causing overcurrent, and therefore an effect is provided that deterioration of the storage battery 1 can be suppressed.

Then, in the case where control has been performed with the control target value of DC bus voltage being increased in order to perform fast charging, when the state of charge of the storage battery 1 has become equal to or greater than the second predetermined value, the control target value of DC bus voltage is decreased. It is noted that in the case of decreasing the control target value of DC bus voltage, as described above, in order to avoid overcurrent charging of the storage battery 1, the control target value of DC bus voltage is gradually decreased on a predetermined step basis without sharply decreasing the control target value of DC bus voltage. Thus, the maximum power supply amount for the storage battery 1 can be suppressed, and the amplitude of ripple of charge current caused due to disturbance or the like can also be suppressed. Therefore, an effect is provided that deterioration of the storage battery 1 due to current ripple can be prevented.

Figure 21:
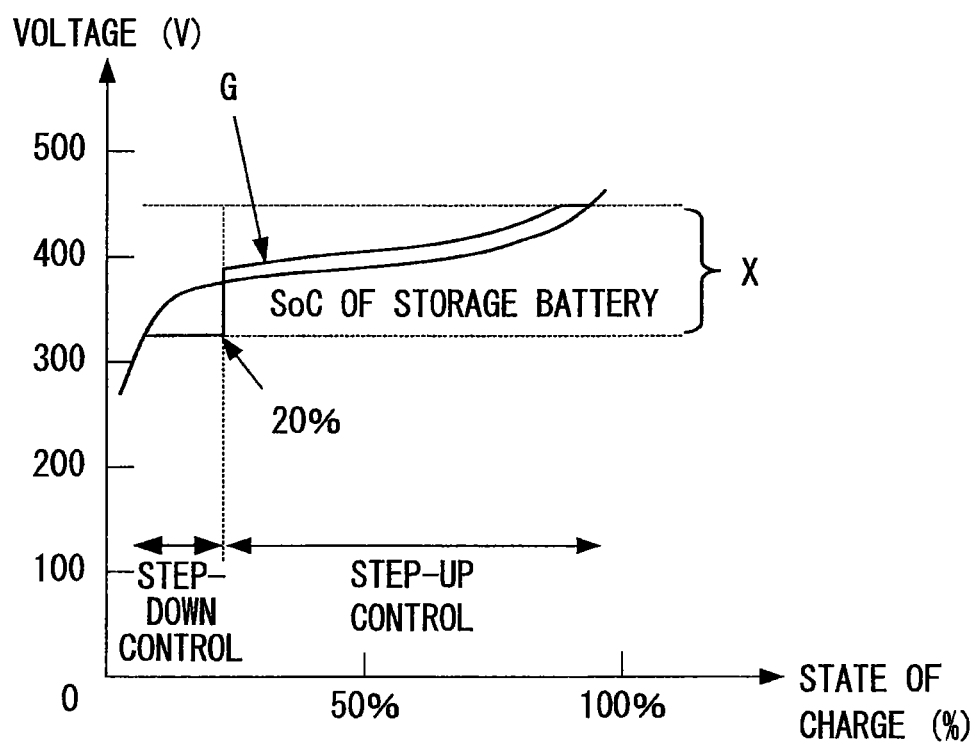
FIG. 21 is a diagram showing an example of the characteristic of the storage battery and DC bus voltage at each value of the state of charge upon discharging in the present embodiment 1.

Next, a control method upon discharging will be described. FIG. 21 shows DC bus voltage at each state of charge and a control method for the DC/DC conversion circuit 13 upon discharging from the storage battery 1 having the same SoC characteristic as in FIG. 12. Upon discharging, basically, in order to prevent over discharge, in a range in which the state of charge of the storage battery 1 is low, the maximum discharge power amount is controlled so as to be restricted, whereby over discharge from the storage battery 1 is suppressed. In addition, since power to the AC load 4 is basically supplied from the power system 3, the speed of response of the DC/DC conversion circuit 13 to power consumption change in the AC load 4 is set to be low so that change in discharge current from the storage battery 1 is made mild. Thus, the control can be performed so as to minimize deterioration of the storage battery 1. As a specific example, in the case where a home electrical appliance is switched on, larger current (referred to as rush current) than the rated current flows at the moment of switch-on. In the following description, the power conversion device 10 of the present embodiment 1 performs control such that the rush current is supplied from the power system 3, thereby suppressing sharp discharge of large current from the storage battery 1 and minimizing deterioration of the storage battery 1.

Figure 22:
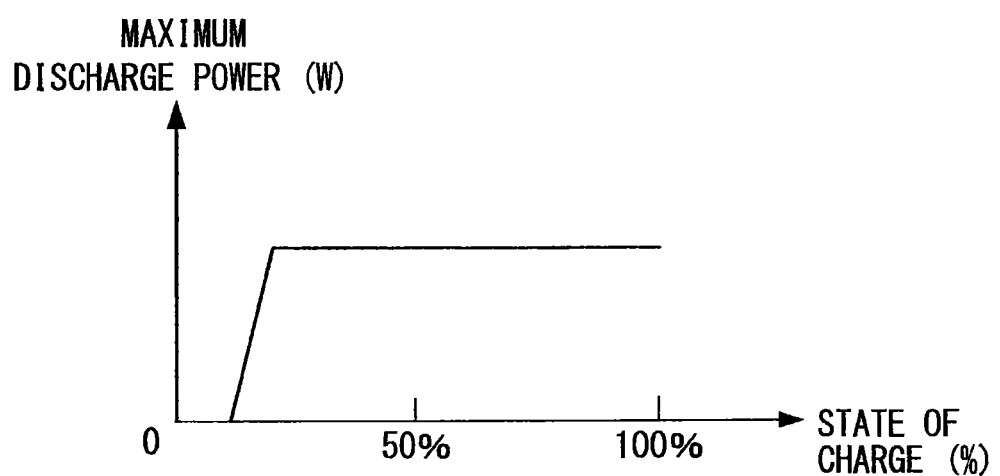
FIG. 22 is a diagram showing an example of a maximum discharge power amount at each value of the state of charge upon discharging in the case of using the storage battery having the characteristic shown in FIG. 21 in the present embodiment 1.

Hereinafter, with reference to FIGS. 21 and 22, control upon discharging of the storage battery 1 will be described. FIG. 22 shows the maximum discharge power at each state of charge upon discharging in the case of using the storage battery 1 having the characteristic shown in FIG. 21 in the present embodiment 1. As shown in FIG. 22, in the present embodiment 1, when the state of charge of the storage battery 1 has become smaller than the third predetermined value, the maximum discharge current is restricted, thereby suppressing over discharge from the storage battery 1. Hereinafter, the control method for the DC/DC conversion circuit 13 by the storage battery control circuit 56 upon discharging will be described.

In FIG. 1, when a discharge request is issued to the storage battery 1 from the HEMS, the storage battery control circuit 56 in the DC/DC control circuit 14 confirms whether or not the storage battery 1 can discharge. Specifically, the storage battery control circuit 56 requests the storage battery management unit 2 in the storage battery 1 to report the state of charge and discharge possibility information about the storage battery 1. When having received the request, the storage battery management unit 2 reports the possibility of discharging and the state of charge to the storage battery control circuit 56. If the storage battery control circuit 56 has received a report that discharging is impossible, the storage battery control circuit 56 reports this to the HEMS and waits for the next instruction to be issued. On the other hand, if discharging is possible, the storage battery control circuit 56 reports the HEMS that discharging is possible. When having received the report that discharging is possible, the HEMS issues discharge power to the storage battery control circuit 56. In the present embodiment 1, it will be assumed that discharge power is periodically issued from the HEMS.

When the discharge power has been issued from the HEMS, the storage battery control circuit 56 calculates the maximum power that can be discharged, based on the temperature information and the maximum discharge power about the storage battery 1 outputted from the storage battery management unit 2, and compares the calculation result with the issued discharge power. If the requested discharge power is greater, the storage battery control circuit 56 reports the discharge power that can be discharged, to the HEMS, and performs discharge control for the storage battery 1 at the maximum discharge power. It is noted that for the calculation of the maximum discharge power, the relationship between each temperature and each SoC value of the storage battery 1 and the maximum discharge power is stored in a memory (not shown) in the storage battery control circuit 56, and the maximum discharge power is calculated by using the stored data. The DC/AC control circuit 18 is instructed to establish connection to the power system 3. In the present embodiment 1, as in the case of charging, the power conversion device 10 is started by a charge/discharge instruction from the external HEMS, and normally, is stopping for the purpose of power saving. When a start instruction has been received from the storage battery control circuit 56, control for the DC/AC conversion circuit 17 is started so as to attain a predetermined DC bus voltage value. In the present embodiment 1, in the case where power is supplied from the power system 3, DC bus voltage of the DC bus 21 is managed by the DC/AC conversion circuit 17.

The storage battery control circuit 56 monitors a DC bus voltage value outputted from the voltmeter 15, and waits for DC bus voltage of the DC bus 21 to reach predetermined voltage. When the DC bus voltage has reached the predetermined voltage, the storage battery control circuit 56 outputs a discharge request to the storage battery management unit 2 in the storage battery 1. When having received the discharge request from the storage battery control circuit 56, the storage battery management unit 2 confirms status information about the storage battery 1, and outputs the state of charge, upper limit voltage and lower limit voltage of the storage battery 1, and temperature information, maximum discharge current information, maximum discharge power, and storage battery voltage about the storage battery 1. When having received the status information about the storage battery 1 from the storage battery management unit 2, the storage battery control circuit 56 confirms the state of charge of the storage battery 1. If the state of charge is smaller than a fifth predetermined value (this value is set for the purpose of avoiding over discharge of the storage battery 1, and here, for example, set at 10%) of the maximum state of charge, it is determined that there is no discharge power because further discharge would damage the storage battery 1. Therefore, the storage battery control circuit 56 reports the HEMS that discharging is impossible, and also, outputs a stop request to the DC/AC control circuit 18 and waits until reception of the next instruction. On the other hand, if the state of charge is equal to or greater than the fifth predetermined value, i.e., 10%, discharging is performed until the state of charge becomes smaller than the fifth predetermined value.

When determining that the state of charge of the storage battery 1 is equal to or greater than the fifth predetermined value, the storage battery control circuit 56 confirms storage battery voltage of the storage battery 1. In the present embodiment 1, as in the case of charging, storage battery voltage outputted from the storage battery management unit 2 is used. It is noted that, as a confirmation method for voltage of the storage battery 1, voltage information outputted from the voltmeter 11 may be used. After having confirmed battery voltage of the storage battery 1, the storage battery control circuit 56 compares the state of charge of the storage battery 1 with a fourth predetermined value. If the state of charge is smaller than the fourth predetermined value, the storage battery control circuit 56 determines that the state of charge of the storage battery 1 is small, and performs discharge control by step-down control. On the other hand, if the state of charge is equal to or greater than the fourth predetermined value, the storage battery control circuit 56 determines that the state of charge is sufficiently left, and performs discharge control by step-up control.

It is noted that here, the fourth predetermined value is set at 20% of the state of charge in a full charge state.

If the storage battery control circuit 56 has determined that the state of charge of the storage battery 1 is equal to or greater than the fourth predetermined value, the storage battery control circuit 56 selects a step-up control method, and sets a control target value of DC bus voltage at a voltage value that allows the maximum discharge power shown in FIG. 22 to be discharged, based on the step-up control. At this time, if the set control target value of DC bus voltage is above the control range of DC bus voltage, the storage battery control circuit 56 controls the control target value of DC bus voltage to be upper limit voltage of the control range of DC bus voltage so that the control target value falls within the control range. In this case, discharge power is decreased by the corresponding amount as compared to the maximum discharge power in FIG. 22.

It is noted that, if the control target value G of DC bus voltage cannot fall within the control range, the storage battery control circuit 56 selects discharge control by step-down control, and continues the control until the control target value of DC bus voltage enters the control range. At this time, the control target value G of DC bus voltage is controlled to be lower limit voltage of the control range of DC bus voltage in order to secure as large discharge power as possible. Then, when the control target value G of DC bus voltage has entered the control range, the storage battery control circuit 56 stops the discharge control for the storage battery 1 once, and switches the control method to the step-up control method, to start discharge from the storage battery 1.

When discharge from the storage battery 1 by step-up control has been selected, the storage battery control circuit 56 instructs the discharge step-up control circuit 53 to start step-up discharge control, and instructs the switch circuit 55 to select a control instruction value outputted from the discharge step-up control circuit 53. When having received the step-up discharge start instruction from the storage battery control circuit 56, the discharge step-up control circuit 53 initializes an internal register (not shown) and the like, and starts control for the DC/DC conversion circuit 13, using discharge power outputted from the storage battery control circuit 56 as a control target. Meanwhile, when the step-up discharge control has been started, the storage battery control circuit 56 calculates discharge power and periodically reports the calculation result to the discharge step-up control circuit 53. In the calculation of discharge power, in order to prevent current output by overcurrent from the storage battery 1, the discharge power is gradually increased on a predetermined power basis, and is reported to the discharge step-up control circuit 53. It is noted that also when a discharge power instruction value outputted from the HEMS has changed, the discharge power is not sharply changed, but is gradually changed on a predetermined power basis. Thus, discharge by overcurrent from the storage battery 1 is suppressed, and unnecessary deterioration of the storage battery 1 is suppressed.

While discharging is performed, when the state of charge of the storage battery 1 has become smaller than the fourth predetermined value, the storage battery control circuit 56 switches the discharge control method from step-up control to step-down control. When the state of charge of the storage battery 1 outputted from the storage battery management unit 2 has become smaller than the fourth predetermined value, the storage battery control circuit 56 stops the discharge control once, and then instructs the discharge step-down control circuit 54 to start step-down discharge control. At this time, the storage battery control circuit 56 also instructs the switch circuit 55 to select a control instruction value from the discharge step-down control circuit 54. When having received the step-down discharge start instruction from the storage battery control circuit 56, the discharge step-down control circuit 54 initializes an internal register (not shown) and the like, and starts control for the DC/DC conversion circuit 13, using discharge power outputted from the storage battery control circuit 56 as a control target.

Meanwhile, when the step-down discharge control has been started, as in the case of step-up control, the storage battery control circuit 56 calculates discharge power and periodically reports the calculation result to the discharge step-down control circuit 54. In the calculation of discharge power, in order to prevent current output by overcurrent from the storage battery 1, the discharge power is gradually increased on a predetermined power basis, and is reported to the discharge step-down control circuit 54. It is noted that also when a discharge power instruction value outputted from the HEMS has changed, the discharge power is not sharply changed, but is gradually changed on a predetermined power basis. Thus, as in the case of step-up control, discharge by overcurrent from the storage battery 1 is suppressed, and unnecessary deterioration of the storage battery 1 is suppressed. In addition, upon the switching to step-down control, the storage battery control circuit 56 also switches the control target value of DC bus voltage to lower limit voltage of the control range of DC bus voltage. Also at this time, the control target is not sharply changed but is controlled to be gradually decreased on a predetermined voltage step basis.

When the step-down control has been started, the storage battery control circuit 56 calculates the maximum discharge power based on the state of charge and battery temperature information about the storage battery 1 outputted from the storage battery management unit 2, compares the calculation result with discharge power issued by the HEMS, determines discharge power that is to be discharged from the storage battery 1, and then reports the determination result to the discharge step-down control circuit 54. The discharge step-down control circuit 54 controls the DC/DC conversion circuit 13, using the discharge power reported from the storage battery control circuit 56 as a control target. Then, when the state of charge of the storage battery 1 has become smaller than 10%, the storage battery control circuit 56 outputs a stop instruction to the discharge step-down control circuit 54 so as to end the discharge control, and also outputs a stop instruction to the DC/AC control circuit 18. At this time, the storage battery control circuit 56 also reports the HEMS that the state of charge has become empty.

In the present embodiment 1, since the discharge control is performed as described above, also in the case of discharging from the storage battery 1, the maximum discharge power is set to be optimal based on the discharge control method for the storage battery 1 and DC bus voltage of the DC bus 21. Therefore, an effect is provided that ripple of discharge current caused by, for example, change in discharge power, and the like can be suppressed, and damage of the storage battery 1 upon discharging can be minimized. In addition, when the state of charge of the storage battery 1 is low, the maximum power that can be discharged from the storage battery 1 is restricted, whereby an effect is provided that over discharge is reliably prevented. Further, when discharge power from the HEMS has changed, the control target is gradually changed, whereby an effect is provided that occurrence of overcurrent in the discharge current from the storage battery 1 due to discharge power change can be suppressed, and damage of the storage battery 1 can be suppressed. Further, responsiveness of control for the DC/DC conversion circuit 13 in the case where power is being supplied from the power system 3 is suppressed to be low, whereby ripple current of discharge current caused by change in the control target power or input of disturbance can be suppressed to be small, and therefore, an effect is provided that damage of the storage battery 1 can be reduced.

In the above, discharge control in the case where power is being supplied from the power system 3 has been described, but the present invention is not limited thereto. Hereinafter, a discharge control method in the case of power outage will be described. In the case of power outage, since power is not supplied from the power system 3, the DC/AC conversion circuit 17 generates AC voltage by itself. Therefore, DC bus voltage of the DC bus 21 is controlled by the DC/DC conversion circuit 13. When power outage has been detected, the storage battery control circuit 56 in the DC/DC control circuit 14 outputs a stop instruction to the DC/AC control circuit 18. When having received the stop instruction, the DC/AC control circuit 18 stops operation of the DC/AC conversion circuit 17. It is noted that power outage is detected by the DC/AC conversion circuit 17 and the DC/AC control circuit 18 monitoring the power system 3. However, in the present embodiment 1, a power outage detection method is not mentioned, and under the assumption that power outage has been detected, only discharge operation of the power conversion device 10 in the case of power outage will be described below.

When having detected power outage, the storage battery control circuit 56 stops charge/discharge control for the storage battery 1 once. Then, after having confirmed the stoppage, the storage battery control circuit 56 starts discharge control for the storage battery 1 based on battery information outputted from the storage battery management unit 2 in the storage battery 1. At this time, the control target value of DC bus voltage and selection of step-up/step-down control are the same as in the case where power is supplied from the power system 3. However, since power is not supplied from the power system 3 in the case of power outage, DC bus voltage of the DC bus 21 is managed by the DC/DC conversion circuit 13. Therefore, in the discharge control for the storage battery 1, the DC/DC control circuit 14 controls discharge power from the storage battery 1 so that the DC bus voltage becomes target voltage in both cases of step-down control and step-up control.

For example, when the state of charge of the storage battery 1 is about 80% and the battery temperature is normal, the storage battery control circuit 56 selects step-up control. Therefore, the storage battery control circuit 56 instructs the discharge step-up control circuit 53 to start discharge control using the calculated control target value of DC bus voltage as a control target. At this time, the storage battery control circuit 56 also instructs the switch circuit 55 to select output of the discharge step-up control circuit 53. When having received the instruction from the storage battery control circuit 56, the discharge step-up control circuit 53 starts discharge control using, as a target, the control target value of DC bus voltage outputted from the storage battery control circuit 56. At this time, the storage battery control circuit 56 controls the control target value of DC bus voltage so as not to be sharply changed but to be gradually increased on a predetermined voltage step basis. Thus, an effect is provided that overcurrent discharge from the storage battery 1 at the start of discharging can be suppressed.

When the DC bus voltage has reached the control target voltage, the storage battery control circuit 56 instructs the DC/AC control circuit 18 to generate AC voltage. When having received the instruction, the DC/AC control circuit 18 starts control for the DC/AC conversion circuit 17 so as to generate AC voltage having a predetermined amplitude. It is noted that in the present embodiment 1, in the case of power outage, since AC voltage is generated by the DC/AC conversion circuit 17 and power is supplied to the AC load 4, it is necessary to supply power such that, for example, even if the AC load 4 is switched on and rush current flows, the power conversion device 10 can activate the device in the AC load 4. Therefore, at least, the discharge step-up control circuit 53 changes various control parameters so as to increase the response speed in discharge power control for the storage battery 1 as compared to the case where a system normally operates (for example, sets a gain in proportional control to be greater than in normal case, and an integral time in integral control to be shorter).

By performing control as described above, even when power consumption of the AC load 4 has increased suddenly, discharge power from the storage battery 1 increases along with the increase in the power consumption, whereby an effect is provided that the device that is operating can continue its operation without being stopped. In addition, also when power consumption of the AC load 4 has decreased suddenly, discharge power from the storage battery 1 can be decreased in accordance with the decrease in the power consumption, whereby an effect is provided that the effective value of AC voltage outputted from the DC/AC conversion circuit 17 can be suppressed within a predetermined range.

When the state of charge of the storage battery 1 has decreased to be close to the fourth predetermined value, in order to prevent over discharge from the storage battery 1, the storage battery control circuit 56 decreases the value of the maximum discharge power for calculation of the control target value of DC bus voltage, and calculates the control target value of DC bus voltage again. In addition, while monitoring the state of charge of the storage battery 1, when the state of charge has further decreased to be smaller than the fourth predetermined value, the storage battery control circuit 56 switches the discharge control method from step-up control to a step-down control method. The switching from step-up control to step-down control is performed at a time (zero cross point) when a voltage waveform outputted from the DC/AC conversion circuit 17 crosses 0V.

The reason is as follows. In the case of switching the discharge control for the DC/DC conversion circuit 13 from step-up control to step-down control (or the opposite case), the control signals supplied to the switching devices 31*a* to 31*d* and 32*a* to 32*d* are completely different. Therefore, if the control is suddenly switched, for example, the switching devices 31*a* and 31*b* might both become conductive at the same time. In this case, very large current flows in the DC/DC conversion circuit 13, so that the power conversion device 10 detects overcurrent and then normally, stops. Therefore, in the case of switching the control method, it is necessary to stop operation of the DC/DC conversion circuit 13 once and discharge energy stored in the reactor 35 before switching the control method. Therefore, upon switching of the control method, about several microseconds are required. Therefore, in the present embodiment 1, the control method is switched near the zero cross point of AC voltage where power consumption of the AC load 4 is comparatively small and power is hardly supplied to the AC load 4.

Thus, since power supplied to the AC load 4 is small upon the switching, power stored in the capacitor 33 or 34 can be discharged to supply power to the AC load 4, whereby an effect is provided that the power conversion device 10 can be operated without instantaneous power stop. In addition, in the case where the state of charge of the storage battery 1 is low, discharging by step-down control can be performed, whereby an effect is provided that the maximum value of discharge power can be restricted. In addition, as described above, in the case of power outage, response performance in discharge control is increased as compared to the case where power is supplied from the power system 3, whereby an effect is provided that, in the case of power outage, even when power consumption of the AC load 4 has changed suddenly, required power can be supplied so as to follow the response. Also, in a normal case, since the response performance is low, even when discharge power has changed suddenly, current ripple of discharge current can be minimized, and damage of the storage battery 1 can be minimized.

It is noted that, also in the case of the storage battery 1 having, for example, the SoC characteristic shown in FIG. 19 or 20 described in charge control, which is different from the SoC characteristic shown in FIG. 21, and in which the storage battery voltage partially or entirely exceeds the control range of DC bus voltage, discharge control can be performed in the same manner as described above. That is, although the detailed description is omitted, the storage battery control circuit 56 selects a step-up control method or a step-down control method as appropriate based on the storage battery voltage, the state of charge, and the control range of DC bus voltage, whereby it becomes possible to perform discharge processing in accordance with each characteristic of the storage batteries while suppressing damage of the storage battery as much as possible.

Embodiment 2

Hereinafter, modifications of the above-described embodiment 1, to which the present invention is applicable, will be described as embodiment 2.

That is, in embodiment 1, with regard to the state of charge of the storage battery 1, the storage battery control circuit 56 sets the first, second, and third predetermined values that are threshold values for selecting a control method in charge control and for stopping charging, at 20%, 80%, and 95%, respectively, and sets the fourth and fifth predetermined values that are threshold values for selecting a control method in discharge control and for stopping discharging, at 20% and 10%, respectively. However, in application of the present invention, needless to say, threshold values different from these exemplary ones may be set in consideration of the characteristic of the storage battery 1, and further, the entire configuration of a system including the power system 3 and the AC load 4, importance, and the like.

In addition, in embodiment 1, the power conversion device using only the storage battery 1 has been described for the purpose of simplification, but the present invention is not limited thereto. Needless to say, the present invention may be applied to a system in which a solar battery or wind power generation is additionally provided as a distributed power source utilizing natural energy, whereby the same effect as described above is provided. In addition, in embodiment 1, the case where a stationary storage battery is used as the storage battery 1 has been described, but the present invention is not limited thereto. Needless to say, for example, a storage battery of an electric automobile may be used, whereby the same effect is provided.

In addition, in embodiment 1, the case where a lithium-ion battery is used as the storage battery 1 has been described, but the present invention is not limited thereto. Further, the storage battery management unit 2 is provided in the storage battery 1, but the present invention is not limited thereto. For example, the power conversion device 10 itself may manage information about the storage battery 1, whereby the same effect is provided. In addition, in embodiment 1, the case where each control (charge/discharge step-up/step-down control) is performed by hardware has been described for the purpose of simplification, but the present invention is not limited thereto. Needless to say, all or some of the above circuits may be mounted on a central integrated circuit (CPU) so as to be realized as software that operates on the CPU, whereby the same effect is provided. In addition, needless to say, the functions of the above circuits may be divided into software and hardware so as to realize the same function.

In addition, in embodiment 1, the case where a DC/DC conversion circuit of insulation type shown in FIG. 2 is used as the configuration of the DC/DC conversion circuit 13 has been described, but the present invention is not limited thereto. Needless to say, a DC/DC conversion circuit of non-insulation type not using the insulation transformer 36 may be used, whereby the same effect is provided. Further, needless to say, the circuit configuration is not limited to that shown in FIG. 2.

In addition, in embodiment 1, the method shown in FIGS. 4 to 7 has been described as a control method for the DC/DC conversion circuit 13 of insulation type, but the present invention is not limited thereto. For example, in the case of performing step-up control, the phases of control signals having Duty of 50% that are supplied to the switching devices 31a to 31d can be controlled and the phases of control signals having Duty of 50% that are supplied to the switching devices 32a to 32d can be controlled. Thereby power to charge the storage battery 1 or power discharged from the storage battery 1 can be controlled.

Further, in embodiment 1, state of charge information about the storage battery 1 outputted from the storage battery management unit 2 is used for switching the control method for the storage battery 1, but the present invention is not limited thereto. For example, needless to say, based on the relationship between the state of charge and the storage battery voltage, the control method may be switched by using the storage battery voltage outputted from the voltmeter 11. In addition, needless to say, information about the storage battery 1 such as state of charge information may be managed in the storage battery control circuit 56 in the DC/DC control circuit 14. In addition, needless to say, switching information about the control method for the storage battery 1 may be outputted from the storage battery management unit 2 which manages deterioration information about the storage battery 1.

It is noted that, within the scope of the present invention, the above embodiments may be freely combined with each other, or each of the above embodiments may be modified or abbreviated as appropriate.

The invention claimed is:

1. A power conversion device, connected between a storage battery and an AC system, which charges the storage battery with power from the AC system and discharges power from the storage battery to the AC system, the power conversion device comprising:
    a DC/DC conversion circuit for performing conversion between a storage battery voltage of the storage battery and a DC bus voltage;
    a DC/AC conversion circuit for performing conversion between the DC bus voltage and an AC voltage of the AC system; and
    control circuits for controlling the DC/DC conversion circuit and the DC/AC conversion circuit, wherein
    the control circuits
        select one of four available controls as a selected control method for the DC/DC conversion circuit based on the storage battery voltage, a state of charge of the storage battery, and a control range of the DC bus voltage,
            the four available controls including a first step-up control in a case of charging the storage battery with power from the AC system, a first step-down control in the case of charging the storage battery with power from the AC system, a second step-up control in a case of discharging power from the storage battery to the AC system, and a second step-down control in the case of discharging power from the storage battery to the AC system,
        set a control target value of the DC bus voltage, and
        control the DC/DC conversion circuit and the DC/AC conversion circuit by the selected control method so that the DC bus voltage becomes the control target value.

2. The power conversion device according to claim 1, wherein, in the case of charging the storage battery with power from the AC system, the control circuits select, as the selected control method, the first step-down control method when the state of charge is smaller than a first predetermined value or is equal to or greater than a second predetermined value, or the first step-up control method when the state of charge is equal to or greater than the first predetermined value and is smaller than the second predetermined value, and keep each selected control method when a control target value of the DC bus voltage set based on the selected control method falls within the control range of the DC bus voltage, or select one of the first step-down control and the first step-up control, that is different from each selected control method, when the control target value does not fall within the control range of the DC bus voltage.

3. The power conversion device according to claim 1, wherein, in the case of charging the storage battery with power from the AC system, the control circuits receive a step-down maximum charge current value that is a maximum charge current value allowed in the step-down control method, and a temperature of the storage battery, and compares the step-down maximum charge current value with a maximum charge current value that can be flowed into the storage battery at the temperature, if the step-down maximum charge current value is smaller than the maximum charge current value, the control circuits select, as the selected control method, the first step-down control method when the state of charge is smaller than a first predetermined value or is equal to or greater than a second predetermined value, or the first step-up control method when the state of charge is equal to or greater than the first predetermined value and is smaller than the second predetermined value, and keep each selected control method when a control target value of the DC bus voltage set based on the selected control method falls within the control range of the DC bus voltage, or selects one of the first step-down control and the first step-up control, that is different from each selected control method, when the control target value does not fall within the control range of the DC bus voltage, and if the step-down maximum charge current value is equal to or greater than the maximum charge current value, the control circuits always select the first step-down control method.

4. The power conversion device according to claim 1, wherein, in the case of discharging power from the storage battery to the AC system, the control circuits select, as the selected control method, the second step-down control method when the state of charge is smaller than a fourth predetermined value, or the second step-up control method when the state of charge is equal to or greater than the fourth predetermined value, and keep each selected control method when a control target value of the DC bus voltage set based on the selected control method falls within the control range of the DC bus voltage, or select one of the second step-down control and the second step-up control, that is different from each selected control method, when the control target value does not fall within the control range of the DC bus voltage.

5. The power conversion device according to claim 1, wherein an AC power supply and an AC load are connected to the AC system, and in the case of discharging power from the storage battery to the AC system, a response speed of a control system is changed in accordance with whether the AC power supply is in a normal state or a power outage state, so that operation of the control system relevant to discharge control for the storage battery when the AC power supply is in a power outage state becomes faster than when the AC power supply is in a normal state.

6. The power conversion device according to claim 1, wherein the control circuits receive a current target instruction value for predetermined charging or discharging, and a temperature of the storage battery, and compare the current target instruction value with a current maximum value for the charging or discharging, that can be flowed into the storage battery at the temperature, if the current target instruction value is equal to or greater than the current maximum value, set the current maximum value as a current control target value for the charging or discharging, and if the current target instruction value is smaller than the current maximum value, set the current target instruction value as the current control target value.

7. The power conversion device according to claim 6, wherein the control circuits control the DC/DC conversion circuit and the DC/AC conversion circuit so that current of the storage battery increases from an initial value thereof to the current control target value at a rate of predetermined time constant.

8. The power conversion device according to claim 1, wherein when switching of a control method for the DC/DC conversion circuit from step-up control to step-down control or from step-down control to step-up control, the control method before the switching is stopped once, current of the storage battery is made to be zero, and the control method after the switching is started after a control variable of the control method is initialized once.

9. The power conversion device according to claim 1, wherein the DC/DC conversion circuit is composed of a DC/AC converter having switching devices, for performing conversion between the storage battery voltage and intermediate AC voltage, and an AC/DC converter having switching devices, for performing conversion between the intermediate AC voltage and the DC bus voltage, when the DC/DC conversion circuit performs the first step-down control, switching operation of the switching devices of the DC/AC converter, and when the DC/DC conversion circuit performs the second step-down control, switching operation of the switching devices of the AC/DC converter is stopped.

* * * * *